US011314791B2

(12) United States Patent
Singh et al.

(10) Patent No.: US 11,314,791 B2
(45) Date of Patent: Apr. 26, 2022

(54) SMART MATCH AUTOCOMPLETE SYSTEM

(71) Applicant: eBay Inc., San Jose, CA (US)

(72) Inventors: Vikas Singh, San Jose, CA (US); Srinivasan Varippyreddy, Fremont, CA (US); Pramodh Pochu, Santa Clara, CA (US); Sushma Sharma, Cupertino, CA (US); Kavya Mugadur, Milpitas, CA (US); Christopher Michael Matthews, San Jose, CA (US); Konstantin Orlov, San Jose, CA (US); Michele Vospette-Kraemer, Belmont, CA (US); Margaret MacDonald, Portland, OR (US); Xia Kristine Song, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 135 days.

(21) Appl. No.: 15/214,237

(22) Filed: Jul. 19, 2016

(65) Prior Publication Data

US 2017/0277770 A1    Sep. 28, 2017

Related U.S. Application Data

(60) Provisional application No. 62/312,032, filed on Mar. 23, 2016, provisional application No. 62/322,532, filed on Apr. 14, 2016.

(51) Int. Cl.
*G06F 16/332* (2019.01)
*G06F 16/28* (2019.01)
(Continued)

(52) U.S. Cl.
CPC ...... *G06F 16/3322* (2019.01); *G06F 16/2228* (2019.01); *G06F 16/2246* (2019.01);
(Continued)

(58) Field of Classification Search
CPC ......... G06F 17/30598; G06F 17/30705; G06F 17/3053; G06F 17/30522; G06F 17/3097;
(Continued)

(56) References Cited

U.S. PATENT DOCUMENTS

| 6,564,213 B1 * | 5/2003 | Ortega ................ G06F 17/3064 707/999.003 |
| 7,493,315 B2 * | 2/2009 | Holbrook ............. G06F 16/958 707/999.1 |

(Continued)

FOREIGN PATENT DOCUMENTS

WO    2017/165669 A1    9/2017

OTHER PUBLICATIONS

"International Application Serial No. PCT/US2017/023848, International Search Report dated Jun. 19, 2017", 2 pgs.
(Continued)

*Primary Examiner* — Ashish Thomas
*Assistant Examiner* — Jedidiah P Ferrer
(74) *Attorney, Agent, or Firm* — Shook, Hardy & Bacon L.L.P.

(57) ABSTRACT

Aspects of the present disclosure include a system comprising a computer-readable storage medium storing at least one program and computer-implemented methods for providing suggestions of additional input to users entering user input into a data input field. In some embodiments, the method includes receiving initial user input entered via a data input field of a user interface rendered on a client device, and identifying a dominant category corresponding to the initial user input. The method further includes identifying a set of aspects corresponding to the dominant category, and selecting, from the set of aspects, a set of aspect suggestions based on a ranking of each aspect in the set of aspects. The method further includes causing display of a suggestion box pre- (Continued)

sented in conjunction with the data input field. The suggestion box comprises a presentation of the set of aspect suggestions.

20 Claims, 23 Drawing Sheets

(51) Int. Cl.
*G06F 16/22* (2019.01)
*G06F 16/2457* (2019.01)
*G06F 16/9032* (2019.01)
*G06F 3/023* (2006.01)
*G06F 16/93* (2019.01)
*G06F 40/174* (2020.01)

(52) U.S. Cl.
CPC ...... *G06F 16/24578* (2019.01); *G06F 16/285* (2019.01); *G06F 16/90324* (2019.01); *G06F 3/023* (2013.01); *G06F 3/0237* (2013.01); *G06F 16/93* (2019.01); *G06F 40/174* (2020.01)

(58) Field of Classification Search
CPC ......... G06F 17/30967; G06F 17/30964; G06F 16/24; G06F 16/242; G06F 16/3322; G06F 16/90324
See application file for complete search history.

(56) References Cited

U.S. PATENT DOCUMENTS

| | | | | |
|---|---|---|---|---|
| 8,667,007 | B2* | 3/2014 | Tao | G06F 16/3322 707/769 |
| 9,600,228 | B2* | 3/2017 | Gur | G06F 16/90332 |
| 9,690,846 | B2* | 6/2017 | Zeng | G06F 16/3322 |
| 10,410,224 | B1* | 9/2019 | Levanon | G06Q 30/02 |
| 2006/0218088 | A1* | 9/2006 | Flora | G06Q 10/10 705/39 |
| 2007/0198497 | A1* | 8/2007 | Loftus | G06F 16/35 707/999.003 |
| 2007/0282811 | A1* | 12/2007 | Musgrove | G06F 16/951 707/999.003 |
| 2008/0033964 | A1 | 2/2008 | Richards et al. | |
| 2009/0049020 | A1* | 2/2009 | Im | G06F 16/36 707/999.003 |
| 2009/0113348 | A1 | 4/2009 | Fein et al. | |
| 2009/0164453 | A1* | 6/2009 | Rothman | G06F 16/9535 707/999.005 |
| 2011/0093488 | A1* | 4/2011 | Amacker | G06F 16/3323 707/767 |
| 2011/0238645 | A1* | 9/2011 | Zhang | G06F 16/242 707/706 |
| 2012/0179705 | A1 | 7/2012 | Kumaran et al. | |
| 2012/0221557 | A1 | 8/2012 | Edmonds et al. | |
| 2012/0265779 | A1* | 10/2012 | Hsu | G06F 17/3064 707/767 |
| 2012/0296926 | A1* | 11/2012 | Kalin | G06F 16/90328 707/765 |
| 2012/0317120 | A1* | 12/2012 | Zhong | G06F 16/24575 707/740 |
| 2013/0268517 | A1* | 10/2013 | Madhavan | G06F 16/9535 707/722 |
| 2014/0006930 | A1 | 1/2014 | Hollis et al. | |
| 2014/0181146 | A1 | 6/2014 | Jamthe et al. | |
| 2014/0188551 | A1* | 7/2014 | Westphal | G06Q 30/0201 705/7.29 |
| 2014/0280291 | A1* | 9/2014 | Collins | G06F 16/90324 707/767 |
| 2015/0248481 | A1* | 9/2015 | Sundaresan | G06F 16/24578 707/723 |
| 2015/0347532 | A1* | 12/2015 | Shaw | G06F 17/30554 707/722 |
| 2015/0379010 | A1 | 12/2015 | Allen et al. | |
| 2017/0185603 | A1* | 6/2017 | Dentel | G06F 17/3064 |
| 2017/0242913 | A1* | 8/2017 | Tijssen | G06F 16/3323 |
| 2017/0277737 | A1 | 9/2017 | Singh et al. | |

OTHER PUBLICATIONS

"International Application Serial No. PCT/US2017/023848, Written Opinion dated Jun. 19, 2017", 4 pgs.
First Action Interview—Pre Interview Communication received for U.S. Appl. No. 15/214,256, dated Jul. 6, 2018, 4 pages.
Response to First Action Interview—Pre Interview Communication filed on Jul. 27, 2018, for U.S. Appl. No. 15/214,256, dated Jul. 6, 2018, 4 pages.
First Action Interview—Office Action Summary received for U.S. Appl. No. 15/214,256 dated Dec. 19, 2018, 35 pages.
Response to First Action Interview—Office Action Summary filed on Feb. 19, 2019, for U.S. Appl. No. 15/214,256, dated Dec. 19, 2018, 18 pages.
Final Office Action received for U.S. Appl. No. 15/214,256, dated May 15, 2019, 36 pages.
International Preliminary Report on Patentability received for PCT Application No. PCT/US2017/023848, dated Oct. 4, 2018, 6 pages.
Applicant Initiated Interview Summary Received For U.S. Appl. No. 15/214,256,dated Jul. 9, 2019.
Office Action Received for Korean Patent Application No. 10-2018-7030465 , dated Aug. 16, 2019, 7 pages (3 pages of English Translation and 4 pages of Official copy).
Extended European Search Report received for European Patent Application No. 17771168.6 dated Sep. 18, 2019, 9 pages.
Final Office Action received for Korean Patent Application No. 10-2018-7030465, dated Feb. 27, 2020, 7 pages (4 pages of Official Copy and 3 pages of English Translation).
Response to Extended European Search Report on filed on Feb. 18, 2020, for European Patent Application No. 17771168.6, dated Sep. 18, 2019, 25 pages.
Office Action received for Korean Patent Application No. 10-2018-7030465, dated May 25, 2020, 11 pages (6 pages of Official Copy and 5 pages of English Translation).
Summons to Attend Oral Proceeding received for European Patent Application No. 17771168.6, dated May 10, 2021, 10 pages.
Brief Communication Received for European Patent Application No. 17771168.6, dated Jan. 5, 2022, 9 Pages.
EPO Written Decision To refuse Received for European Patent Application No. 17771168.6, dated Jan. 20, 2022, 15 Pages.

* cited by examiner

SMART MATCH AUTOCOMPLETE SYSTEM

CROSS REFERENCE TO RELATED APPLICATIONS

This patent application claims the benefit of priority to U.S. Provisional Patent Application Ser. No. 62/312,032, titled "SMART MATCH AND AUTOCOMPLETE CATEGORIZATION," filed Mar. 23, 2016, and U.S. Provisional Patent Application Ser. No. 62/322,532, titled "SMART MATCH AND AUTOCOMPLETE," filed Apr. 14, 2016, each of which are hereby incorporated by reference in their entirety.

TECHNICAL FIELD

This application relates to online content publication platforms. In particular, example embodiments relate to systems and methods for improving search retrieval in online content publication platforms by providing prompts to enter additional relevant terms associated with input being entered into a data input field.

BACKGROUND

Many online content publication platforms allow users to generate and publish content online such as in the form of a web document (e.g., a web page), which may be viewed by other users using a web browser or an application. Typically, content publication platforms include a search engine or other such navigation tool that allows users to input keywords and return a set of results that include relevant content items or publications hosted by the content publication platform.

First-time or occasional users are frequently unable to create detailed titles for their content that target other users' interests and search recall. As a result, the content publication platform hosts an abundance of content that goes unviewed while still utilizing valuable space in data storage. Further, although the content publication platform may host content relevant to a user's query, the search methodologies employed by the content publication platform may be unable to retrieve such content because of deficiencies in the title of the content item. Alternatively, the search methodologies may be unable to retrieve relevant content items because the user's query lacks sufficient detail to identify the types of content the user is searching for.

An online marketplace is an example content publication platform that allows users to create content in the form of a product listing to offer their products for sale to other users. First-time sellers and occasional sellers may be unable to create detailed listing titles that target buyers' interests and search recall. This causes listings with a low quality title to have a decreasing conversion rate, which affects the satisfaction of the sellers in a negative way and may lead the sellers to refrain from continuing to use the online marketplace.

BRIEF DESCRIPTION OF THE DRAWINGS

Various ones of the appended drawings merely illustrate example embodiments of the present disclosure and cannot be considered as limiting its scope.

DETAILED DESCRIPTION

Reference will now be made in detail to specific example embodiments for carrying out the inventive subject matter. Examples of these specific embodiments are illustrated in the accompanying drawings. It will be understood that these examples are not intended to limit the scope of the claims to the illustrated embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details.

Aspects of the present disclosure involve a smart match autocomplete (SMAC) system that addresses the above problems by helping users create high quality content descriptions for use in keyword searching and title creation (e.g., item listing title creation). Leveraging its own data, the content publication platform can guide users on which keywords and descriptions to include in a meaningful query or title based on the category of the content (e.g., item category). This data is based on data analysis that identifies what item attributes are most important, and surface those aspects to the user so that they can include them in the content title for publication.

Figure 1:
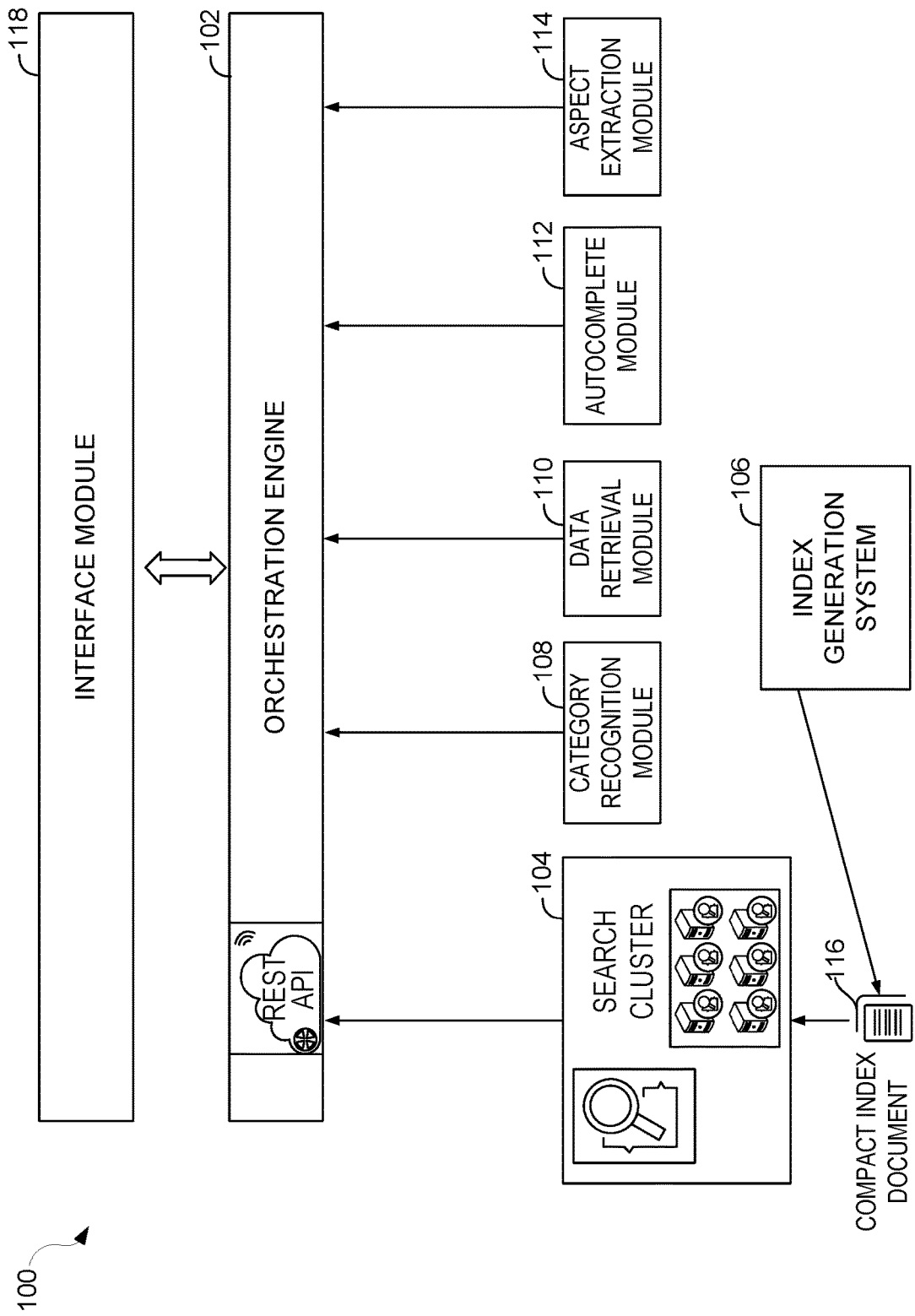
FIG. 1 is an architecture diagram depicting a smart match autocomplete (SMAC) system, according to example embodiments.

FIG. 1 is an architecture diagram depicting a SMAC system 100, according to example embodiments. As shown, the SMAC system 100 includes: an orchestration engine 102; a search cluster 104; an index generation system 106; a category recognition module 108; a product data retrieval module 110; an autocomplete module 112; an aspect extraction module 114; and an interface module 118. Each of the above referenced functional components of the SMAC system 100 are configured to communicate with each other (via, e.g., application programming interfaces (APIs)). Any one or more functional components illustrated in FIG. 1 and described herein may be implemented using hardware (e.g., a processor of a machine) or a combination of hardware and software. For example, any module described herein may configure a processor to perform the operations described herein for that module.

To avoid obscuring the inventive subject matter with unnecessary detail, various functional components (e.g., modules, engines, and databases) that are not germane to conveying an understanding of the inventive subject matter have been omitted from FIG. 1. However, a skilled artisan will readily recognize that various additional functional components may be supported by the SMAC system 100 to facilitate additional functionality that is not specifically described herein. Moreover, any two or more of these components may be combined into a single component, and the functions described herein for a single component may be subdivided among multiple components. Furthermore, according to various example embodiments, any of the functional components illustrated in FIG. 1 may be implemented together or separately within a single machine, database, or device or may be distributed across multiple machines, databases, or devices. For example, any of the functional components of the SMAC system 100 may be implemented as a network service executing on one or more servers.

The orchestration engine 102 communicates and exchanges data with each of the search cluster 104, the category recognition module 108, the data retrieval module 110, the autocomplete module 112, and the aspect extraction module 114 to orchestrate the functionality of the SMAC system 100. In doing so, the orchestration engine 102 receives and processes requests received from user devices, and in turn, communicates one or more requests via an API to one or more of the search cluster 104, the category recognition module 108, the data retrieval module 110, the autocomplete module 112, and the aspect extraction module 114 to retrieve data provided therefrom. For example, the orchestration engine 102 may submit Hypertext Transfer Protocol (HTTP) requests (e.g., GET requests) to the above referenced components via a representational state transfer (REST) API.

The search cluster 104 comprises a set of computing machines (e.g., servers) configured to provide a distributed, multitenant-capable full-text search engine with an interface that is accessible by the orchestration engine 102. More specifically, the search cluster 104 is configured to provide search capabilities with respect to a compact index document 116 generated by the index generation system 106 in an offline process. The search cluster 104 may, for example, be implemented as an Elasticsearch cluster.

The compact index document 116 includes descriptive information related to various content categories. The content categories correspond to content hosted by a network-based content publication platform. Further details of an example content publication platform are discussed below in reference to FIG. 3, according to some embodiments. In an example, the content publication platform is an online marketplace that hosts product listings, and the content categories are product categories. The compact index document 116 may, for example, include a set of aspects for each category, a set of aspect values for each aspect, condition data, product catalog data, and aspect metadata such as metadata tags identifying aspect parent/child relationships, metadata tags indicating whether aspects are compulsory or optional, metadata tags indicating whether aspects sets are open or closed sets, and metadata tags indicating whether certain aspects have single or multiple possible values. Further details regarding the index generation system 106 are discussed below with respect to FIG. 2, and further details regarding the offline process for generating the compact index document 116 are discussed below in reference to FIGS. 4-8.

In response to receiving a request from the orchestration engine 102, the search cluster 104 performs a series of queries on the compact index document 116 to identify a set of aspects for a particular category, which may be any category of content hosted by the content publication platform. In instances in which the category is a product category, the search cluster 104 may query the compact index document identify information related to product aspects and product categories. In querying the compact index document 116, the search cluster 104 utilizes a query structure that is optimized for the format of the compact index document 116. For example, the search cluster 104 may query the compact index document 116 by category to identify aspects of a category and aspect values for each aspect. As another example, the search cluster 104 may query the compact index document 116 by aspect to identify a category to which the aspect belongs and aspect values for the aspect. In yet another example, the search cluster 104 may query the compact index document 116 by aspect value to identify an aspect to which the aspect value belongs and a category to which the identified aspect belongs.

The search cluster 104 may further select and return certain important aspects from the identified aspects as a response to the request from the orchestration engine 102. For example, the search cluster 104 identifies, from each possible aspect of a category, product differentiation aspects, price differentiation aspects, and compulsory aspects that may be necessary to comply with business rules of a content publisher. Product differentiation aspects provide differentiating details with regard to a product that the user is attempting to describe whereas price differentiation aspects provide differentiating details with regard to a monetary value of the product. As an example, in the category of shoes, size is not, in many cases, a price differentiating aspect—regardless of whether the size is 10 or 12, the monetary value of the shoes remains the same. The size is, however, a product differentiating aspect because a buyer will likely be specifically looking for a certain size. On the other hand, the fact that the shoe is leather would be a price differentiating aspect as well as a product differentiating aspect. Compulsory aspects may vary based on category and may include one or more aspects that a content publisher considers non-optional.

The category recognition module 108 is configured to analyze textual input to identify one or more categories corresponding to the textual input. The textual input may include one or more keywords included in user input. In some instances, the one or more keywords correspond to or include descriptors of a product, and the one or more categories identified by the category recognition module 108 include a product category corresponding to the product.

In identifying the one or more categories, the category recognition module 108 may identify a plurality of likely categories that correspond to the textual input. The category recognition module 108 determines a confidence score for each of the identified likely categories based on the likelihood of the category matching the textual input. The determination of the confidence score may, for example, be based, on a number of characters included in the initial textual input, historical supply and demand of products in a particular category, or a combination of both. The category recognition module 108 may select the category with the highest confidence score to return to the orchestration engine 102 in response to a request received therefrom.

The data retrieval module 110 is configured to identify data records associated with received user input (e.g., textual input or selection of a button) and retrieve information included therein. The data records include descriptive information related to content hosted by the content publication platform. In embodiments where the user input describes a product, the data retrieval module 110 retrieves a product data record that includes descriptive information related to the product such as images, descriptions, and in some instances, available inventory. For example, the data retrieval module 110 may use one or more keywords included in textual input to query a database (e.g. a product database) that stores data records. For example, the data records may be indexed in the database by title or other aspects such as brand name, model number, or the like, and the keywords included in the textual input may reference the title or include other such aspects thereby enabling the data retrieval module 110 to locate a corresponding data record in the database.

The autocomplete module 112 is configured to predict a remainder of a word or phrase as a user is entering textual input. The autocomplete module 112 monitors user keystrokes and suggests a list of words based on initially typed characters. As such, the autocomplete module 112 may analyze partial textual input and provide one or more suggestions for additional textual input to complete the partial textual input. The suggestions for additional textual input may be displayed within a graphical user interface (GUI) in which the user is entering the textual input. The user may accept any one of the suggestions through appropriate interaction with the GUI such as by selecting the suggestions (e.g., using the mouse cursor or by providing a touch-based gesture) or by pressing the tab key, for example.

The aspect extraction module 114 is configured to analyze textual input to extract category aspect values included therein. In instances in which the textual input includes keywords corresponding to a product, the aspect extraction module 114 may analyze the textual input to extract product aspect values for the product. For example, upon receiving "diesel slim fit jeans 32" as textual input, the aspect extract module 114 may extract "diesel" as the value for the brand aspect, "slim fit" as the value for the style aspect, and "32" as the value for the size aspect. The aspect extraction module 114 identifies aspect values from textual input by parsing the textual input and comparing individual terms to known aspect values for aspects of the category of the textual input identified by the category recognition module 108.

As shown, the SMAC system 100 may further include an interface module 118 to expose the functionality of the SMAC system 100 to user devices. The interface module 118 further provides a number of interfaces (e.g., APIs or UIs) that allow data to be exchanged with the SMAC system 100. The interface module 118 receives requests from user devices, and communicates appropriate responses to the devices. The interface module 118 may, for example, receive requests from devices in the form of Hypertext Transfer Protocol (HTTP) requests or other web-based API requests.

The interface module 118 may further provide a user interface by transmitting presentation data to the user devices that enable the user devices to present the UI on a display. The interface module 118 may transmit the presentation data to a user device along with a set of instructions to display the presentation data. The user device may temporarily store the presentation data to enable display of the UI. The UIs may also include various input control elements (e.g., sliders, buttons, drop-down menus, checkboxes, and data input fields) that allow users to specify various inputs, and the interface module 118 receives and processes user input received through such input control elements.

Figure 2:
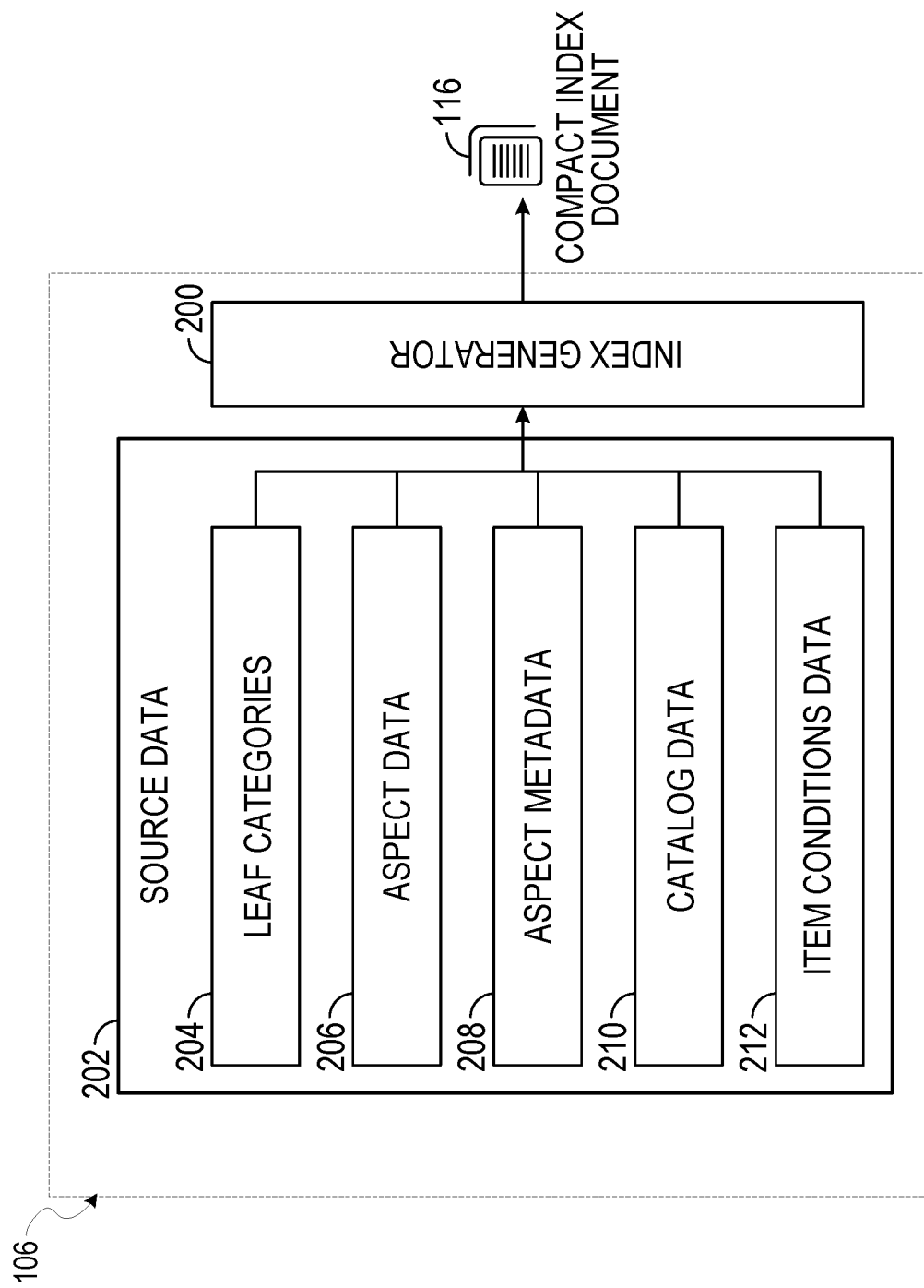
FIG. 2 is an architecture diagram depicting an index generation system, which is provided as a subsystem of the SMAC system, according to example embodiments.

FIG. 2 is an architecture diagram depicting the index generation system 106, according to example embodiments. As discussed above, the index generation system 106 is a component of the SMAC system 100, and may thusly be considered a subsystem of the SMAC system 100. As shown, the index generation system 106 includes an index generator 200 that obtains source data 202 including leaf categories 204, aspect data 206, aspect metadata 208, catalog data 210, and item conditions data 212.

The content publication platform classifies hosted content using a particular taxonomy. The taxonomy may be maintained in a category tree. The category tree is a data structure that includes a hierarchical tree structure with linked nodes representing content categories. Following the example content publication platform of an online marketplace, the category tree may correspond to a product category tree and each node represents a product category. A top node of the tree is considered a root node. The root node may include one or more child nodes (e.g., nodes directly connected to the root node), each of which may be a parent node to additional child nodes. In the context of a category tree, each child node may represent a subcategory of the category represented by the parent node. A node with no children is considered a leaf node. Thus, leaf categories 204 correspond to categories in the category tree with no children, or in other words, categories or subcategories with no further subcategories. The leaf categories 204, therefore, represent the lowest level of granularity in the category tree used by the content publication platform to classify and organize content.

The aspect data 206 comprises a set of aspects for each of the leaf categories 204 corresponding to a most granular classification of the content taxonomy of the content publication platform. The set of aspects may include aspects from various aspect classifications such as price differentiating aspects, product differentiating aspects, and compulsory aspects. The aspect data 206 further includes differentiating scores for each aspect. The differentiating scores include: a product differentiating score that provides a measure of the aspect in differentiating a product corresponding to the initial user input from other products in a dominant category; and a price differentiating score that provides a measure of the aspect in differentiating a monetary value of a product corresponding to the initial user input from monetary values of other products in the dominant category. The differentiating scores may be determined based on an analysis of historical supply and demand (e.g., based on an analysis of transaction records) of products offered for sale on an online marketplace. For example, transaction records maintained by an online marketplace may be analyzed to determine which aspects of a product lead to products being sold for a higher price.

The aspect metadata 208 comprises one or more tags that provide additional information with respect to aspects included in the aspect data 206. The tags may, for example, include one or more of any of the following: a parent/child tag indicating whether a particular aspect has a parent-child relation with another aspect; a multiple/single select tag indicating whether an aspect has a single or multiple values; and an open/closed tag indicating whether a set of aspects is an open or closed set.

The catalog data 210 includes catalog-enabled flags indicating whether any of the leaf categories 204 are backed by catalog product data. In other words, the catalog-enabled flag indicates whether the content publication platform maintains catalog product data, which includes information describing a particular product, for a given leaf category. For leaf categories 204 that include the catalog-enabled flag, the catalog data 210 may further include the catalog product data for products included in those leaf categories 204.

The item conditions data 212 include a set of conditions for products in each of the leaf categories 204. In the example category of clothing, the item conditions may include "New," "New with tags," and "Used." In the example category of vinyl records, the item conditions may include "New," "Used—Like New," "Used—Very Good," "Used—Good," "Used—Acceptable."

The index generator 200 may obtain the source data 202 from one or more network services (e.g., an application executing on a server) by communicating an appropriate request (e.g., HTTP GET request) via one or more APIs of the one or more network services. The index generator 200 generates the compact index document 116 using a combination of the source data 202. For each of the leaf categories 204, the compact index document 116 includes a corresponding set of aspects (e.g., compulsory, price differentiating, and product differentiating), a set of aspect values for each aspect, (e.g., for aspect "color," the aspects values include "red" "white" "blue" and "black"), aspect metadata (e.g., indicating whether a set of aspects is opened or closed set or whether aspects include parent/child relationship), a set of item conditions, differentiating scores for each aspect in the set of aspects, a catalog-enabled flag, and in some instances, product catalog data. Aspect values in the compact index document 116 may be converted into keys to enable more efficient search (e.g., faster recall) of the compact index document 116. For example, aspect values that include special characters may be converted to a key that omits such special characters (e.g., aspect value "rockies-wireless" may be converted to key "Rockies Wireless"). The index generator 200 may generate the compact index document 116 in a language-independent format such as JavaScript Object Notation (JSON) format.

Consistent with some embodiments, the index generator 200 may generate the compact index document 116 as part of an offline batch job (e.g., a series of tasks executed without manual intervention). Generating the compact index document 116 as part of an offline batch job provides the benefit of shifting the time of the job process to when computing resources are less busy while avoiding idling the computing resources with frequent manual intervention and supervision. Moreover, rather than running one program multiple times to process one transaction at a time, the offline batch process executes only once for many transactions, thereby reducing system overhead. Further details regarding the process of the index generator 200 for generating the compact index document 116 are discussed below in reference to FIGS. 4-8.

Figure 3:
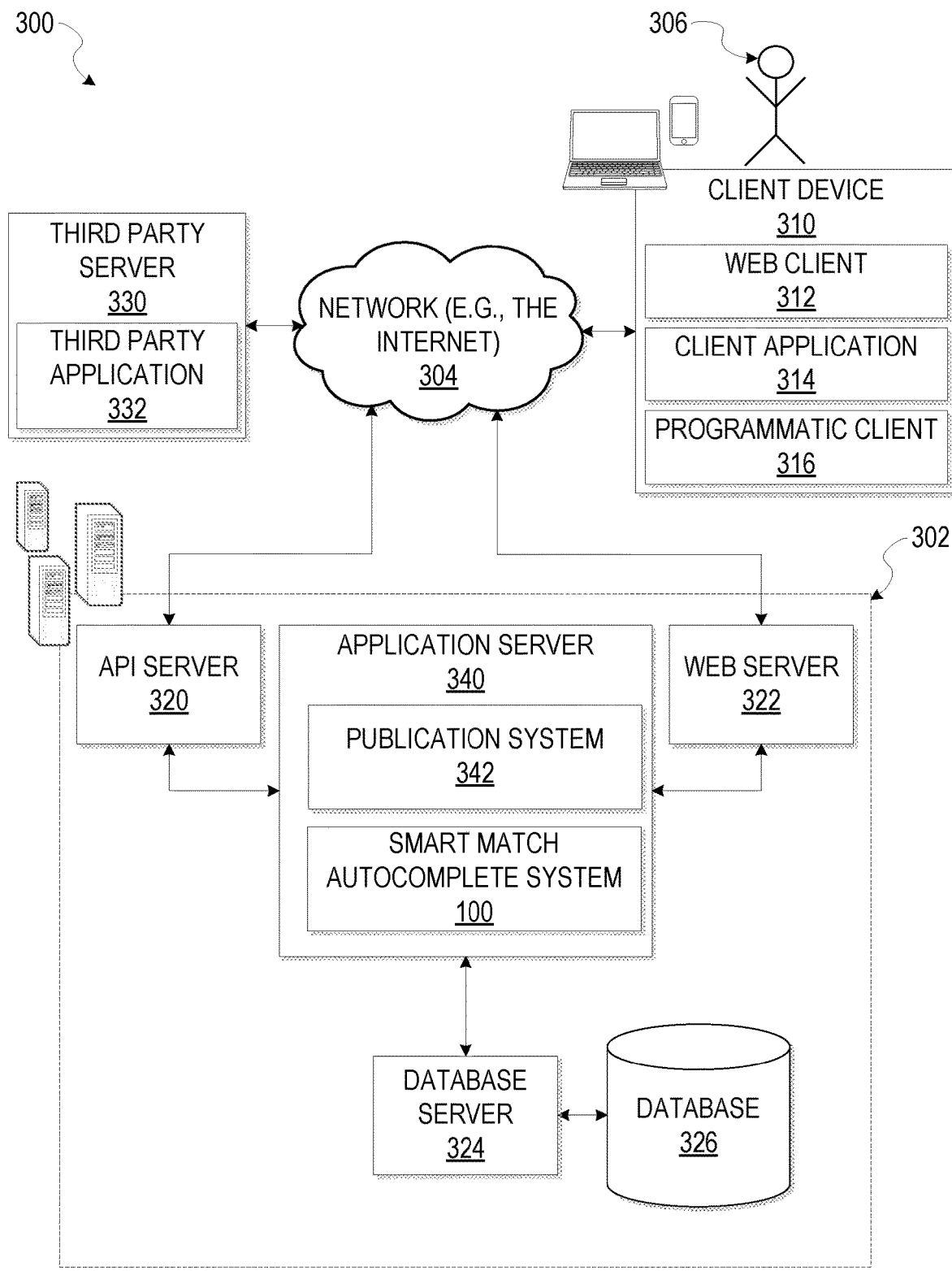
FIG. 3 is a block diagram depicting a network environment in which the SMAC system operates, according to example embodiments.

With reference to FIG. 3, an example embodiment of a high-level client-server-based architecture 300 is shown. While FIG. 3 depicts the client-server-based architecture 300, the present inventive subject matter is, of course, not limited to such an architecture, and could equally well find application in an event-driven, distributed, or peer-to-peer architecture system, for example. Further, to avoid obscuring the inventive subject matter with unnecessary detail, various functional components that are not germane to conveying an understanding of the inventive subject matter have been omitted from FIG. 3. Moreover, it shall be appreciated that although the various functional components illustrated in FIG. 3 are discussed in a singular sense, multiple instances of any one of the various functional components may be employed.

A content publication platform 302 provides server-side functionality via a network 304 (e.g., the Internet or wide area network (WAN)) to one or more client devices 310. FIG. 3 illustrates, for example, a web client 312 (e.g., a browser), a client application 314, and a programmatic client 316 executing on the client device 310. One or more portions of network 304 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 310 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the content publication platform 302. In some embodiments, the client device 310 may comprise a display module (not shown) to display information (e.g., in the form of user interfaces). In further embodiments, the client device 310 may comprise one or more of touch screens, accelerometers, gyroscopes, cameras, microphones, global positioning system (GPS) devices, and so forth. In one embodiment, the content publication platform 302 is a network-based marketplace that publishes publications (e.g., web documents) comprising item listings of products available on the network-based marketplace.

One or more users 306 may be a person, a machine, or other means of interacting with client device 310. In example embodiments, the user 306 is not part of the network architecture 300, but may interact with the network architecture 300 via client device 310 or another means. For example, the user 306 may provide input (e.g., touch screen input or alphanumeric input) to the client device 310, and the input is communicated to the content publication platform 302 via the network 304. In this instance, the content publication platform 302, in response to receiving the input from the user 306, communicates information to the client device 310 via the network 304 to be presented to the user 306. In this way, the user 306 can interact with the content publication platform 302 using the client device 310.

Each client device 310 may include one or more client applications 314 (also referred to as "apps") such as, but not limited to, a web browser, messaging application, electronic mail (email) application, an e-commerce site application (also referred to as a marketplace application), and the like. In some embodiments, if the e-commerce site application is included in the client device 310, then this application is configured to locally provide the user interface and at least some of the functionalities with the application configured to communicate with the content publication platform 302, on an as needed basis, for data or processing capabilities not locally available (e.g., access to a database of items available for sale, to authenticate a user, to verify a method of payment). Conversely if the e-commerce site application is not included in the client device 310, the client device 310 may use its web browser to access the e-commerce site (or a variant thereof) hosted on the content publication platform 302.

An application program interface (API) server 320 and a web server 322 are coupled to, and provide programmatic and web interfaces respectively to, an application server 340. The application server 340 may host a publication system 342 and the SMAC system 100, each of which may comprise one or more modules or applications and each of which may be embodied as hardware, software, firmware, or any combination thereof. The application server 340 is, in turn, shown to be coupled to a database server 324 that facilitates access to a database 326. In an example embodiment, the database 326 is a storage device that stores information (e.g., data records) to be posted (e.g., publications or listings) by the publication system 342. The database 326 may also store digital item information in accordance with example embodiments.

Additionally, a third party application 332, executing on a third party server 330, is shown as having programmatic access to the content publication platform 302 via the programmatic interface provided by the API server 320. For example, the third party application 332, utilizing information retrieved from the content publication platform 302, supports one or more features or functions on a website hosted by the third party.

The publication system 342 provides a number of publication functions and services to the users 306 that access the content publication platform 302. For example, the publication system 342 provides interfaces (e.g., through communication with the client device 310) that allow the user 306 to create and publish web documents using the client device 310. The publication system 342 may further provide interfaces that allow the user 306 to modify various parts of the published web document.

While the publication system 342 and SMAC system 100 are shown in FIG. 3 to both form part of the content publication platform 302 (e.g., the publication system 342 and SMAC system 100 are sub-systems of the content publication platform 302), it will be appreciated that, in alternative embodiments, each system 342 and 100 may form part of a service that is separate and distinct from the content publication platform 302. In some embodiments, the SMAC system 100 may form part of the publication system 342.

Figure 4:
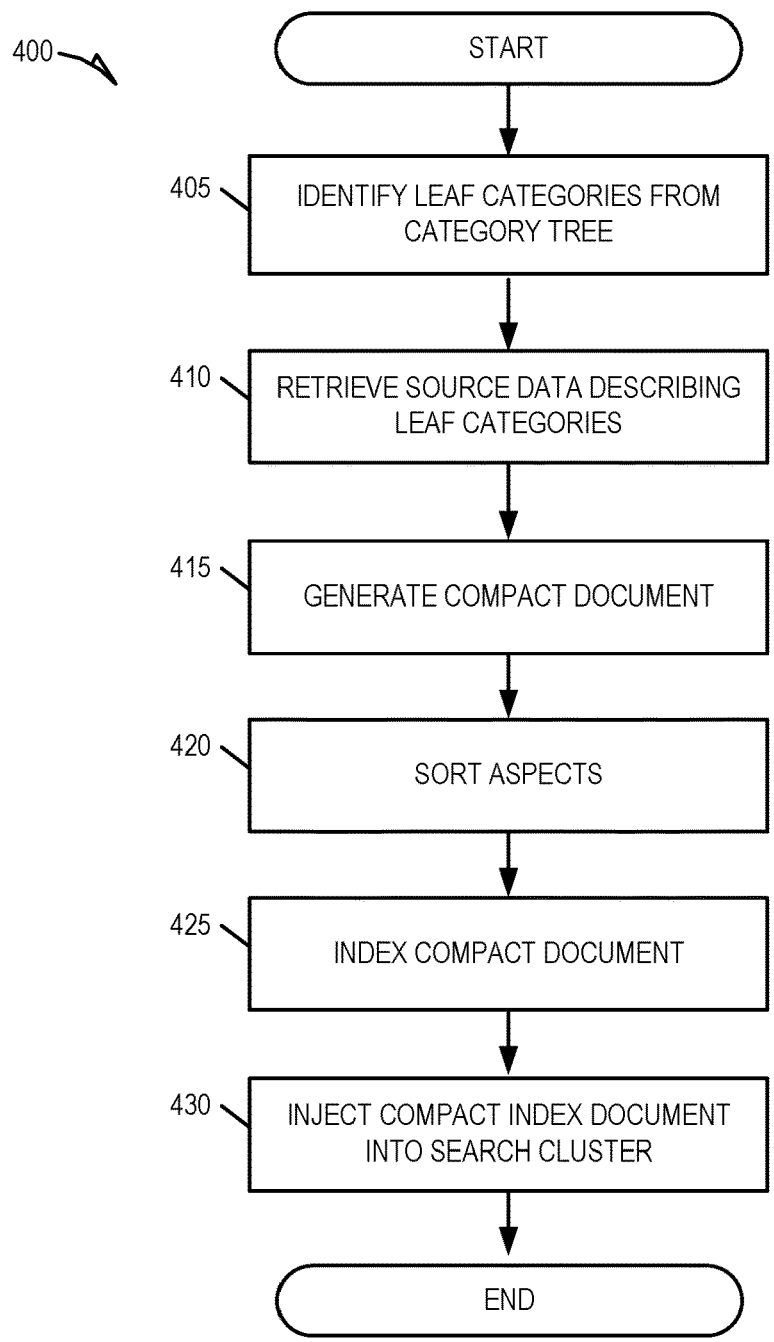
FIGS. 4-7 are flow charts depicting example operations of the index generation system in generating a compact index document, according to example embodiments.

FIG. 4 is a flow chart depicting example operations of the index generation system 106 in performing a method 400 of generating the compact index document 116, according to example embodiments. The method 400 may be embodied in computer-readable instructions for execution by one or more processors such that the operations of the method 400 may be performed in part or in whole by the index generation system 106; accordingly, the method 400 is described below by way of example with reference thereto. However, it shall be appreciated that at least some of the operations of the method 400 may be deployed on various other hardware configurations and the method 400 is not intended to be limited to the index generation system 106.

At operation 405, the index generator 200 identifies leaf categories 204 included in a category tree of the content publication platform 302. The category tree is a data structure including a hierarchical tree structure with linked nodes representing categories (e.g., content or product categories). The category tree is used by the content publication platform 302 to classify and organize content. As noted above, the leaf categories 204 are the categories at the lowest level of granularity in the category tree (e.g., nodes that have no children).

At operation 410, the index generator 200 retrieves source data 202 describing the leaf categories 204. As noted above, in addition to the leaf categories 204, the source data 202 includes aspect data 206, aspect metadata 208, catalog data 210, and item conditions data 212. The source data 202 may be retrieved from one or more sources such as network services that are internal to the content publication platform 302 or provided by a third party. For example, the index generator 200 may communicate one or more appropriately formatted requests (e.g., HTTP GET requests) to one or more network service via one or more APIs to retrieve the source data 202 therefrom.

At operation 415, the index generator 200 generates a composite document (e.g., an electronic document) using a combination of the source data 202. The document provides a basis for the compact index document 116. For each of the leaf categories 204, the compact index document includes a corresponding set of aspects, aspect metadata (e.g., indicating whether a set of aspects is opened or closed or whether aspects include parent/child relationship), a set of item conditions, differentiating scores for each aspect in the set of aspects, a catalog-enabled flag, and in some instances, product catalog data. The index generator 200 may generate the composite document in a language-independent format such as JSON.

At operation 420, the index generator 200 sorts the set of aspects for each of the leaf categories 204 based the differentiating scores (e.g., product differentiating score and price differentiating scores) included in the source data 202. For example, the index generator 200 may sort the set of aspects in ranked order that takes into account aspects identified as compulsory aspects, product differentiating scores of aspects, and price differentiating scores of aspects.

In some embodiments, as part of the sorting, the index generator 200 may segment the set of aspects based on the sorted order. For example, the index generator 200 may classify a subset of the aspects as compulsory aspects based on the aspect metadata 208 indicating such aspects are compulsory. As another example, the index generator 200 may classify the subset of aspects with the highest ranked ordered according to product differentiating scores as being product differentiating aspects. As yet another example, the index generator 200 may classify the subset of aspects with the highest ranked ordered according to price differentiating scores as being price differentiating aspects. The index generator 200 may sort the aspects in a ranked order as follows: 1) compulsory aspects; 2) price differentiating aspects; and 3) product differentiating aspects.

At operation 425, the index generator 200 indexes the composite document thereby generating the compact index document 116. The index generator 200 may use any indexing algorithm to perform operation 425 that facilitates searching by the search cluster 104.

At operation 430, the index generator 200 injects the compact index document 116 into the search cluster 104. The index generator 200 may inject the compact index document 116 by executing one or more API calls that cause the compact index document 116 to be stored in a memory store (e.g., a network database) that is accessible by the search cluster 104.

Figure 5:
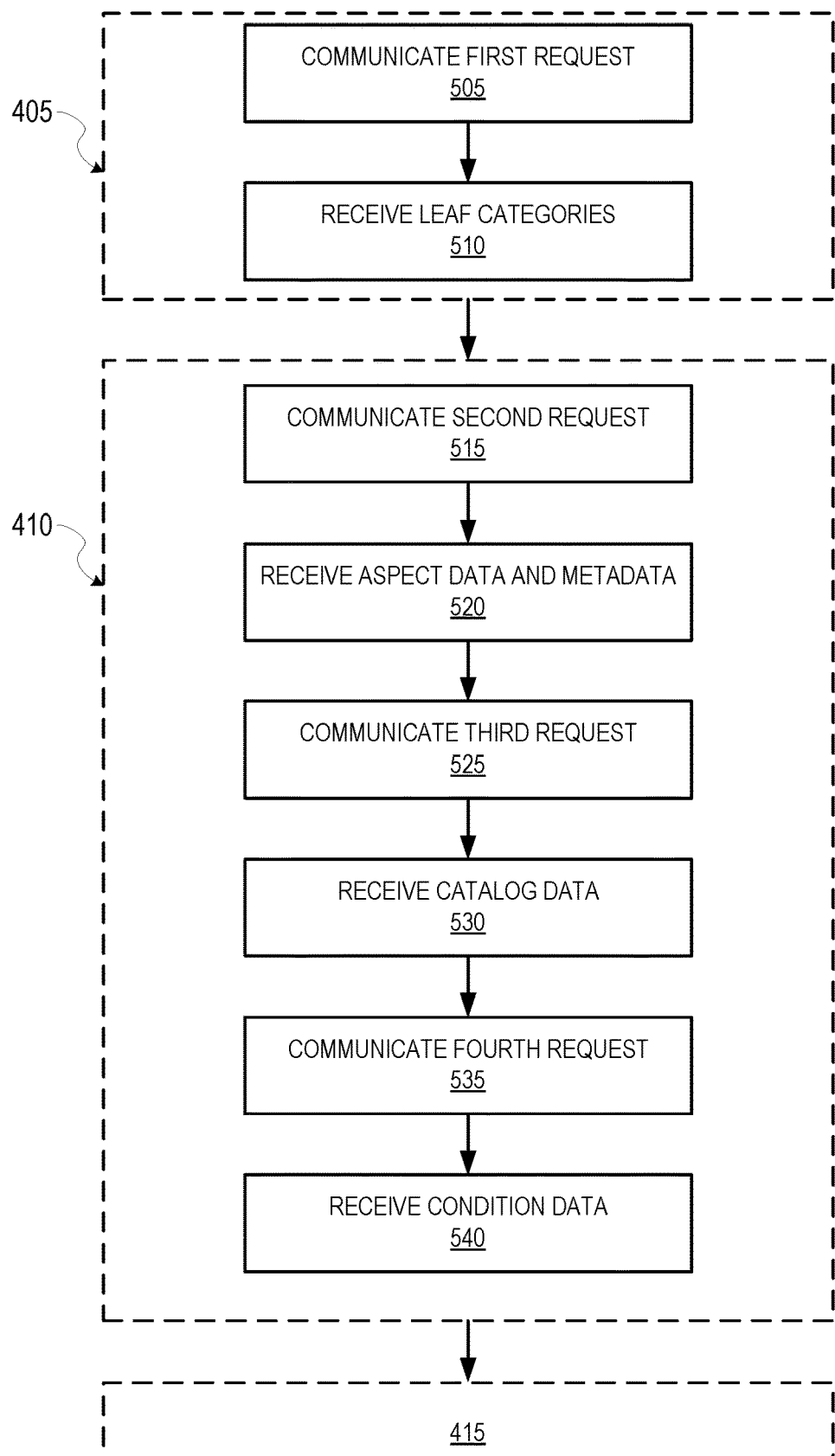

As shown in FIG. 5, the method 400 may include additional operations 505, 510, 515, 520, 525, 530, 535, and 540. In some example embodiments, operations 505 and 510 may be performed as part (e.g., a precursor task, a subroutine, or a portion) of operation 405 of the method 400, in which the index generator 200 identifies the leaf categories 204. At operation 505, the index generator 200 communicates, via a first API, a first request (e.g., an HTTP GET request) to a first network service responsible for maintaining and analyzing the category tree. In response to receiving the request, the first network service traverses the category tree to identify leaf nodes (e.g., nodes with no child nodes) corresponding to the leaf categories 204. At operation 510, the index generator 200 receives the leaf categories 204 from the first network service in response to the first request.

In some example embodiments, operations 515, 520, 525, 530, 535, and 540 may be performed as part (e.g., a precursor task, a subroutine, or a portion) of operation 410 of the method 400, in which the index generator 200 obtains the source data 202. At operation 515, the index generator 200 communicates, via a second API, a second request (e.g., an HTTP GET request) to a second network service responsible for maintaining and analyzing the aspect data 206 and aspect metadata 208. In response, the second network service accesses one or more data records (e.g., stored in the database 326) to identify the aspect data 206 and the aspect metadata 208. At operation 520, the index generator 200 receives the aspect data 206 and the aspect metadata 208 from the second network service in response to the second request.

At operation 525, the index generator 200 communicates, via a third API, a third request (e.g., an HTTP GET request) to a third network service responsible for maintaining and analyzing the catalog data 210. In response, the third network service accesses one or more data records (e.g., stored in the database 326) to determine which categories are product catalog data-enabled, and in instances in which a category is product catalog data-enabled, the third network service retrieves the corresponding catalog data 210. At operation 530, the index generator 200 receives the catalog data 210 from the third network service in response to the third request.

At operation 535, the index generator 200 communicates, via a fourth API, a fourth request (e.g., an HTTP GET request) to a fourth network service responsible for maintaining and analyzing the item conditions data 212. In response, the fourth network service accesses one or more data records (e.g., stored in the database 326) to identify the item conditions data 212. At operation 540, the index generator 200 receives the item conditions data 212 from the fourth network service in response to the fourth request.

Figure 6:
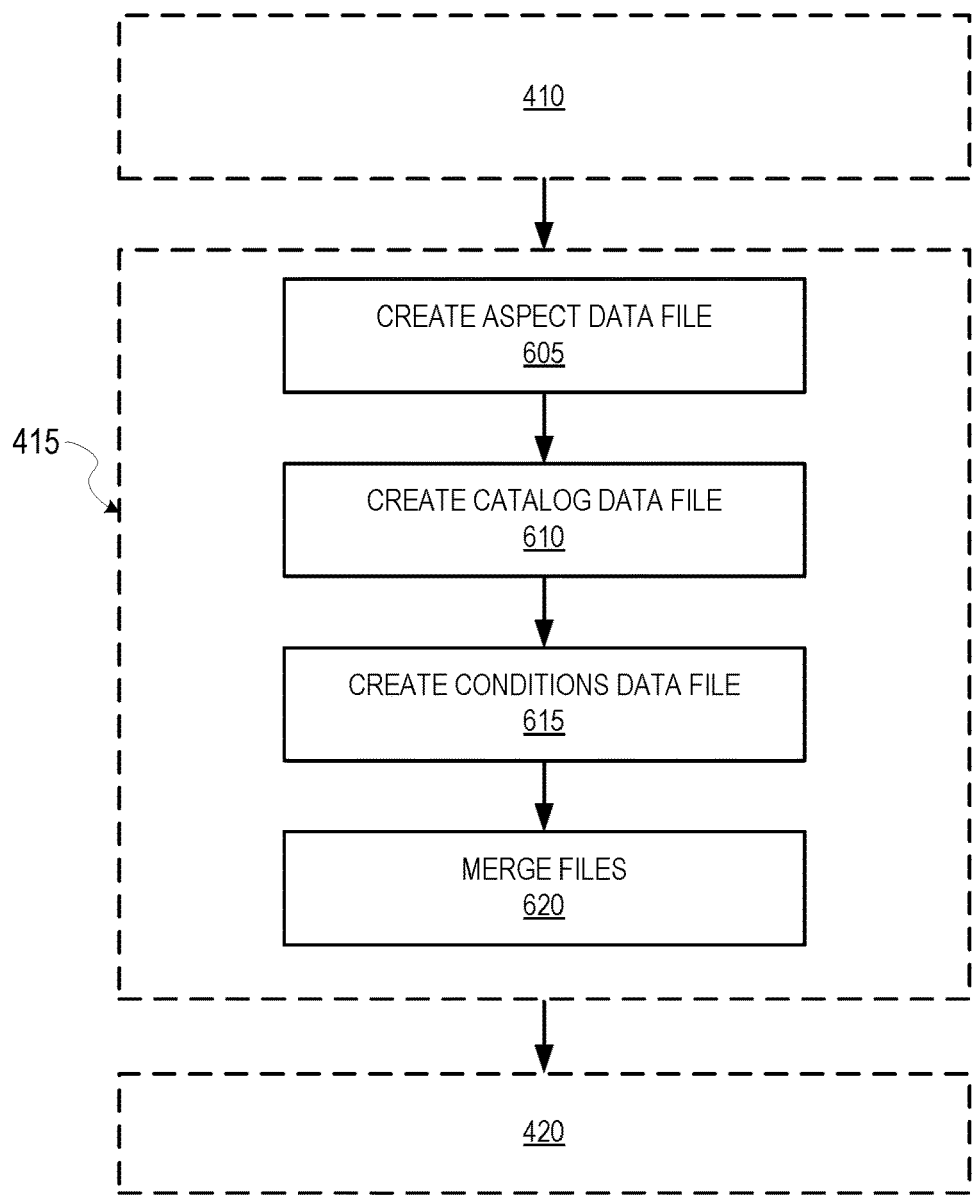

As shown in FIG. 6, the method 400 may include additional operations 605, 610, 615, and 620. In some example embodiments, operations 605, 610, 615, and 620 may be performed as part (e.g., a precursor task, a subroutine, or a portion) of operation 415 of the method 400, in which the index generator 200 generates the composite document.

At operation 605, the index generator 200 creates an aspect data file that comprises the aspect data 206 and aspect metadata 208. The aspect data file includes a set of aspects for each of the leaf categories 204, differentiating scores for each aspect, and one or more metadata tags. The index generator 200 creates the aspect data file in a language-independent format such as JSON.

At operation 610, the index generator 200 creates a catalog data file that comprises the catalog data 210. The catalog data file includes indications (e.g., flags) of whether any of the leaf categories 204 include product catalog data, and in instances in which they do, the catalog data file includes the product catalog data. The index generator 200 creates the catalog data file in a language-independent format such as JSON.

At operation 615, the index generator 200 creates a conditions data file that comprises the conditions data 212. The conditions data 212 includes a set of conditions for each of the leaf categories. The index generator 200 creates the conditions data file in a language-independent format such as JSON.

At operation 620, the index generator 200 merges the aspect data file, catalog data file, and conditions data file to create the composite document. As noted above, the index generator 200 creates the composite document in a language-independent format such as JSON.

Figure 7:
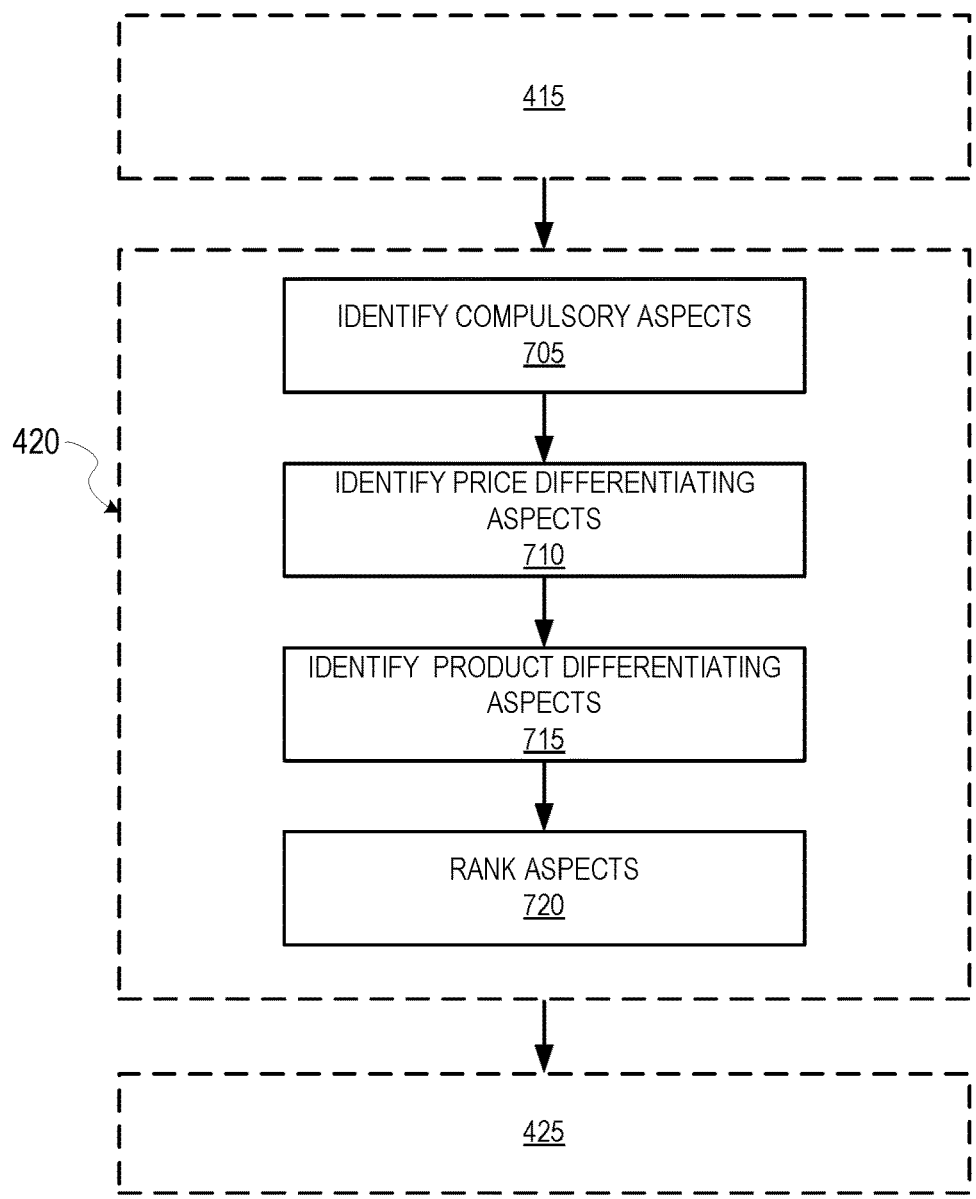
Figure 8:
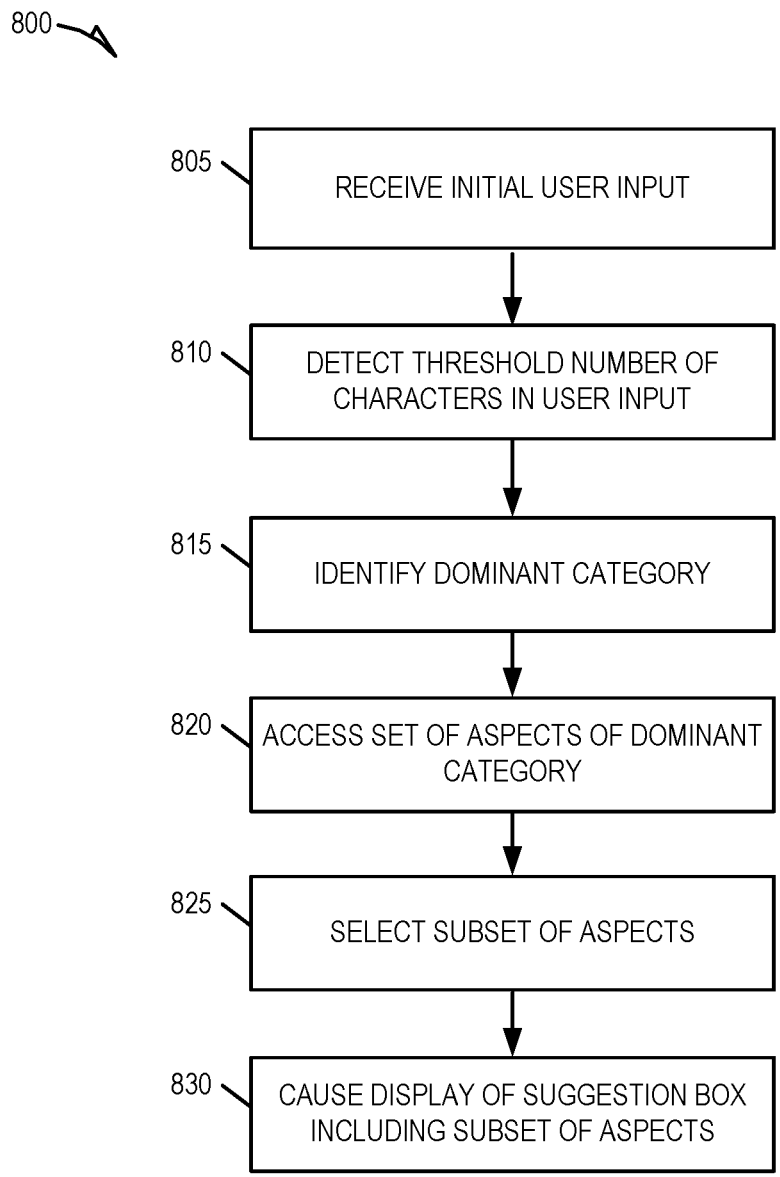
FIGS. 8-12 are flow charts depicting example operations of the SMAC system in providing a SMAC service, according to example embodiments.

As shown in FIG. 7, the method 400 may include additional operations 705, 710, 715, and 720. In some example embodiments, operations 705, 710, 715, and 720 included may be performed as part (e.g., a precursor task, a subroutine, or a portion) of operation 420 of the method 400, in which the index generator 200 sorts the aspects in the composite document. In the context of FIG. 7, operations 705, 710, 715, and 720 may be repeated for each leaf category's (of the leaf categories 204) corresponding set of aspects.

At operation 705, the index generator 200 identifies compulsory aspects for the leaf category from the set of aspects based on a portion of the aspect metadata 208 (e.g., the portion of aspect metadata 208 that describes the set of aspects). The index generator 200 identifies the compulsory aspects by identifying a subset of the set of aspects that include a metadata tag indicating that the aspect is compulsory.

At operation 710, the index generator 200 identifies top price differentiating aspects for the leaf category from the set of aspects based on the price differentiating scores for each aspect in the leaf category. For example, the index generator 200 may identify the price differentiating aspects by identifying a subset of the set of aspects with the highest ranked order according to price differentiating score.

At operation 715, the index generator 200 identifies top product differentiating aspects for the leaf category from the set of aspects based on the product differentiating scores of each aspect in the category. For example, the index generator 200 may identify the product differentiating aspects by identifying a subset of the set of aspects with the highest ranked order according to product differentiating score.

At operation 720, the index generator 200 ranks the set of aspects using the compulsory aspects, top price differentiating aspects, and top product differentiating aspects. For example, the index generator 200 may rank the set of aspects according to aspect classification such as in the following order: 1) compulsory aspects; 2) top price differentiating aspects; and 3) top product differentiating aspects. The index generator 200 may de-duplicate the ranked set of aspects (e.g., by removing one or more duplicate aspects in the set) to compensate for instances in which aspects appear in more than one aspect classification (e.g., aspect is both top price differentiating aspect and product differentiating aspect). In this way, the index generator 200 ensures that a single aspect does not appear multiple times in the ranked set of aspects.

The method 400 may be performed in whole or in part in an offline batch job (e.g., a series of tasks performed without manual intervention). Additionally, the method 400 may be repeated periodically (e.g., weekly) so as to keep the compact index document 116 up to date with current information.

FIGS. 8-12 are flow charts depicting example operations of the SMAC system 100 in a method 800 of providing a SMAC service, according to example embodiments. The method 800 may be embodied in computer-readable instructions for execution by one or more processors such that the operations of the method 800 may be performed in part or in whole by the SMAC system 100; accordingly, the method 800 is described below by way of example with reference thereto. However, it shall be appreciated that at least some of the operations of the method 800 may be deployed on various other hardware configurations and the method 800 is not intended to be limited to the SMAC system 100.

At operation 805, the interface module 118 receives initial user input (e.g., textual input or selection of an interactive element) entered by a user into a user interface rendered (e.g., displayed) on the client device 310. For example, the data input field may be a textual input field such as a search box, and the user 306 may enter initial textual input into the textual input field. The initial user input may include one or more full or partial keywords that correspond to a partial title or partial description (e.g., of a product). As another example, the data input field may include one or more interactive elements (e.g., selectable buttons or other such UI elements) that correspond to categories, sub-categories, aspects, or aspect values, and the initial user input may include selection of one such interactive element (e.g., a button corresponding to category or sub-category of a product).

At operation 810, which is optional in some embodiments, the orchestration engine 102 detects a threshold number of characters included in the initial textual input. The threshold number may be a configurable value set by an administrator of the SMAC system 100.

At operation 815, the orchestration engine 102 identifies a dominant category corresponding to the initial user input, which, in some embodiments, is responsive to determining textual input included as part of the initial user input includes the threshold number of characters. In embodiments in which the user input includes keywords that correspond to a product, the orchestration engine 102 identifies a product category corresponding to the product. In an example, the user may enter "jeans" and the orchestration engine 102 may identify "clothing" as the dominant category.

In identifying the category corresponding to the initial user input, the orchestration engine 102 may communicate a request (e.g., an HTTP GET request) to the category recognition module 108 that includes the initial user input. In response, the category recognition module 108 identifies a plurality of likely categories that correspond to the initial user input. The category recognition module 108 assigns a confidence score to each of the identified likely categories based on the likelihood of the category matching the initial user input (e.g., based on the number of characters in the user input and/or historical supply and demand of products in each category). The category recognition module 108 then uses the confidence scores to select the dominant category, which is the category with the highest confidence score. The category recognition module 108 provides the dominant category back to the orchestration engine 102 in response to the request. In some embodiments, the response also includes a least a portion of the remaining plurality of likely categories.

At operation 820, the orchestration engine 102 identifies a set of aspects corresponding to the dominant category. The set of aspects includes various combinations of aspect classifications. For example, the set of aspects may include any one of the following aspect classifications: compulsory aspects, price differentiating aspects, product differentiating aspects.

In identifying the set of aspects corresponding to the dominant category, the orchestration engine 102 communicates a search request to the search cluster 104. The search request may, for example, include the dominant category, and in response to receiving the search request, the search cluster 104 uses the dominant category to search the compact index document 116 (e.g., by performing a series of queries) to identify the set of aspects that correspond to the dominant category. For example, the search cluster 104 may perform queries to identify all aspects by category, queries to identify all aspects by category and aspect name, and queries to identify all aspects by category, aspect name, and a token. The search cluster 104 provides the set of aspects back to the orchestration engine 102 in response to the request. As discussed above, the set of aspects may be sorted based on aspect metadata and differentiating scores (e.g., product differentiating scores or price differentiating scores). For example, the set of aspects may be in the following ranked order: 1) compulsory aspects; 2) price differentiating aspects; and 3) product differentiating aspects.

At operation 825, the orchestration engine 102 selects a subset of the set of aspects for presentation within the user interface as aspect suggestions to consider in completing the initial user input being entered into the data input field. The subset of aspects includes the aspects that are considered the most important aspects for the dominant category. Accordingly, the subset of aspects may include product differentiation aspects, price differentiation aspects, and compulsory aspects. The subset of the set of aspects may be selected based on a ranking assigned to the set of aspects based on one or more differentiating scores. For example, the orchestration engine 102 may select the subset of aspects with the highest ranking. The number of aspects included in the subset of aspects is a configurable value that may be set by an administrator of the SMAC system 100. The number of aspects may also be dynamically configured based on an amount of available display space (e.g., screen size). Accordingly, the SMAC service provided by the SMAC system 100 may be varied between mobile and web experiences.

At operation 830, the orchestration engine 102 works in conjunction (e.g., by making one or more API calls) with the interface module 118 to cause display, within the user interface rendered on the client device 310, of a suggestion box presented in conjunction with the data input field (e.g., below the data input field). The suggestion box comprises a presentation of the set of aspect suggestions along with a prompt to complete the initial user input (e.g., textual input) using additional input (e.g., additional textual input) related to the set of aspect suggestions. More specifically, the prompt may request that the user enter an aspect value corresponding to one or more of the aspect suggestions. In this way, if the user 306 is attempting to describe a product, the user 306 is prompted to enter important additional information (e.g., aspect values for the aspect suggestions) to improve the description of the product, thereby improving the ability of the content publication platform 302 (in the example form of an online marketplace) to identify the product the user is describing.

In some embodiments, the suggestion box may further include selectable elements (e.g., buttons) that correspond to aspect values for one or more of the set of aspect suggestions. The user 306 may select any one of the selectable elements (e.g., through a mouse click or touch screen gesture) to incorporate the corresponding aspect value as part of further user input.

Figure 9:
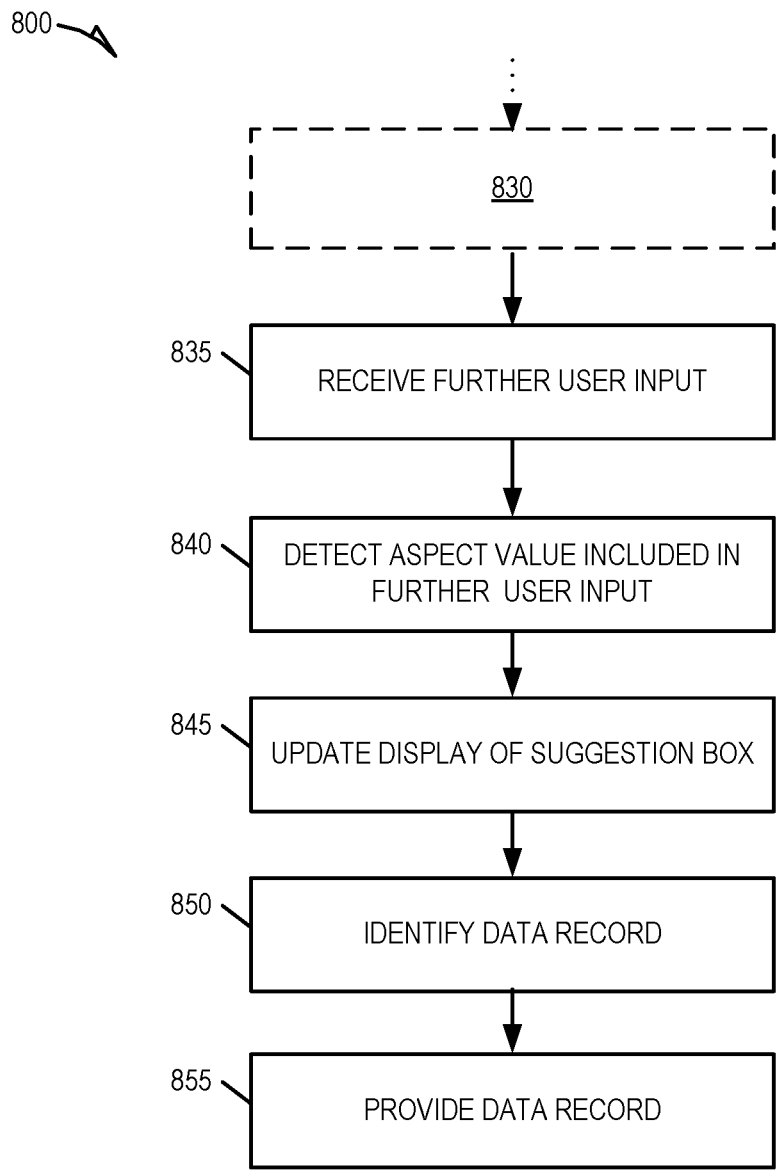

As shown in FIG. 9, the method 800 may include the additional operations 835, 840, 845, 850, and 855. In some example embodiments, operations 835, 840, 845, 850, and 855 may be performed subsequent to operation 830 of the method 800, in which the interface module 118 causes display of the suggestion box in conjunction with the data input field.

At operation 835, the interface module 118 receives further user input (e.g., textual input or a selection of a button corresponding to an aspect value) entered by the user into the user interface rendered (e.g., displayed) on the client device 310. For example, the user 306 may enter further textual input into the data input field (e.g., a search box) after entering the initial textual input. The further textual input may include one or more additional keywords that correspond to a title or description (e.g., of product).

At operation 840, which is optional in some embodiments, the orchestration engine 102 detects an aspect value of an aspect suggestion included in further textual input of the further user input. In an example, the aspect suggestions displayed in the suggestion box include "Size," and the orchestration engine 102 detects "Small" included in further textual input.

In response to detecting the aspect value of the aspect suggestion, the orchestration engine 102 communicates a request (e.g., an HTTP GET request) to the aspect extraction module 114 that includes the further textual input. In response, the aspect extraction module 114 compares the further textual input to aspect values for each aspect in the set of aspects corresponding to the dominant category. Based on the comparison, the aspect extraction module 114 identifies the aspect to which the aspect value belongs. The aspect extraction module 114 returns the identified aspect to the orchestration engine 102 in response to the request. The orchestration engine 102 compares the identified aspect returned from the aspect extraction module 114 to the set of aspect suggestions to determine whether the further textual input includes an aspect value of one of the aspect suggestions.

At operation 845, the orchestration engine 102 works in conjunction with the interface module 118 to update the suggestion box based on the further user input. The updating of the suggestion box may include removing display of an aspect suggestion from the presented set of aspects or replacing display of one of the aspect suggestions with an alternative aspect suggestion. In instances in which an aspect suggestion is replaced with an alternative aspect suggestion, the orchestration engine 102 may select the next highest ranked aspect for presentation in the suggestion box as the alternative aspect suggestion.

Subsequent to the updating of the suggestion box—either immediately after the updating or subsequent to entering even further textual input—the user may submit the input entered into the data input field (e.g., a combination of at least the initial user input or further user input) as complete user input. The user may submit the complete input using a selectable element (e.g., button) presented in conjunction with the data input field within the user interface.

At operation 850, the data retrieval module 110 identifies a data record associated with received user input. The data record includes descriptive information related to content hosted by the content publication platform 302. In embodiments where the content publication platform 302 is in the form of an online marketplace, and the user input describes a product, the data retrieval module 110 retrieves a product data record that includes descriptive information related to the product such as images, descriptions, and in some instances, available inventory. The data retrieval module 110 may use one or more keywords included in the completed user input to query the database 326 (e.g., a product database).

At operation 855, the data retrieval module 110 provides a portion of the data record for display (e.g., on the client device 310). In an example, the data record may include a web document (e.g., a web page) that describes a product, and the data retrieval module 110 may provide the web document to the interface module 118 for display on the client device 310. In another example, the data record may include information describing a product, and the data retrieval module 110 may provide the information to the publication system 342 to prepopulate an electronic form for creating a product description (e.g., a product listing).

Figure 10:
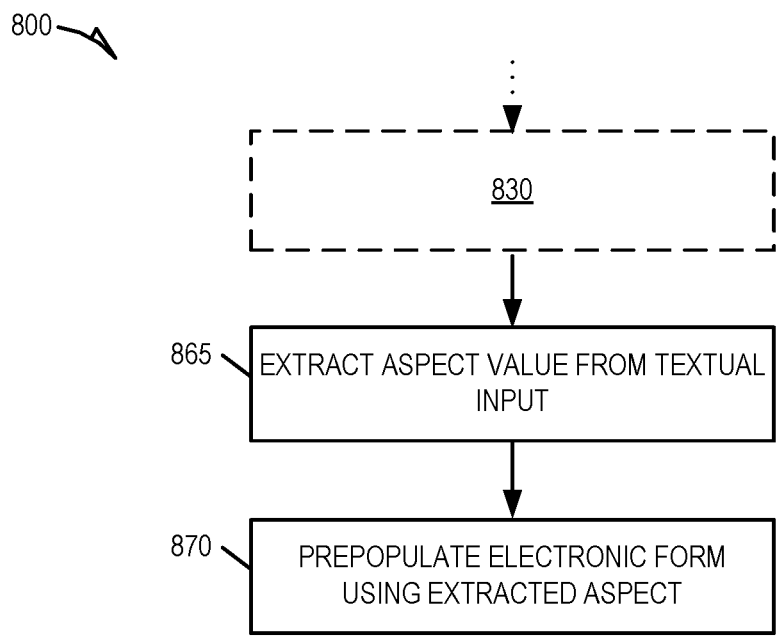

As shown in FIG. 10, the method 800 may include the additional operations 865 and 870. In some example embodiments, operations 865 and 870 included in the method 800 may be performed subsequent to operation 830 of the method 800, in which the interface module 118 causes display of the suggestion box in conjunction with the data input field.

At operation 865, the orchestration engine 102 extracts an aspect value from textual input included in user input entered into the data input field. The textual input includes the initial textual input and may also include further textual input. In extracting the aspect value, the orchestration engine 102 communicates a request (e.g., an HTTP GET request) to the aspect extraction module 114 that includes the textual input. In response, the aspect extraction module 114 parses the textual input to identify keywords and compares the identified keywords to aspect values for each aspect in the set of aspects corresponding to the dominant category. Based on the comparison, the aspect extraction module 114 identifies the aspect to which the aspect value belongs. The aspect extraction module 114 returns the identified aspect to the orchestration engine 102 in response to the request.

At operation 870, the publication system 342, which may be provisioned with the aspect value and the identified aspect by the SMAC system 100, prepopulates an electronic form using the aspect value and the identified aspect. The electronic form may, for example, be provided for creating a product description (e.g., for use in a product listing). The electronic form may include a plurality of data input fields, each of which corresponds to an aspect. In prepopulating the electronic form, the publication system 342 may use the aspect value to populate (e.g., fill) the field corresponding to the identified aspect.

Figure 11:
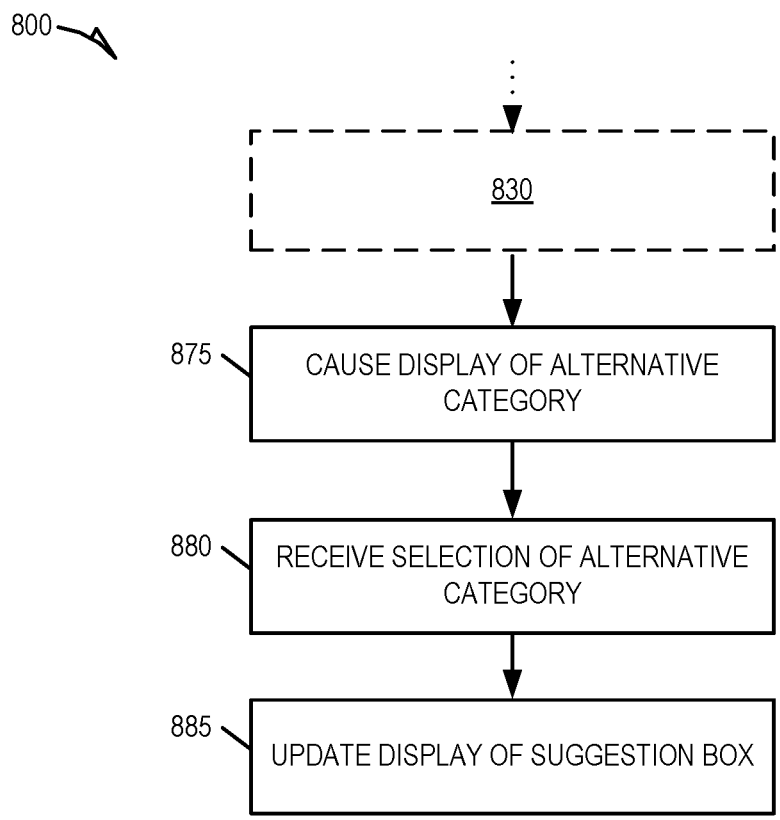

As shown in FIG. 11, the method 800 may include the additional operations 875, 880, and 885. In some example embodiments, operations 875, 880, and 885 may be performed subsequent to or as part of (e.g., a precursor task, a subroutine, or a portion) operation 830 of the method 800, in which the interface module 118 causes display of the suggestion box in conjunction with the data input field.

At operation 875, the interface module 118 causes display of an alternative category in conjunction with the suggestion box presented within the user interface. The alternative category may be selected from the remaining plurality of likely categories corresponding to the initial textual input provided by the category recognition module 108. For example, the alternative category may be the category with the next highest confidence score when compared to the dominant category.

At operation 880, the interface module 118 receives input indicative of a user selection of the alternative category. The user 306 may select the alternative category through appropriate interaction with the text of the alternative category using one or more input devices.

At operation 885, the orchestration engine 102 works in conjunction with the interface module 118 to update the display of the suggestion box according to the alternative category. Updating the display of the suggestion box may include replacing the set of aspect suggestions that correspond to the dominant category with an alternative set of aspect suggestions that correspond to the alternative category. The orchestration engine 102 selects the alternative set of aspect suggestions corresponding to the alternative category according to the methodologies discussed above with respect to the dominant category.

Figure 12:
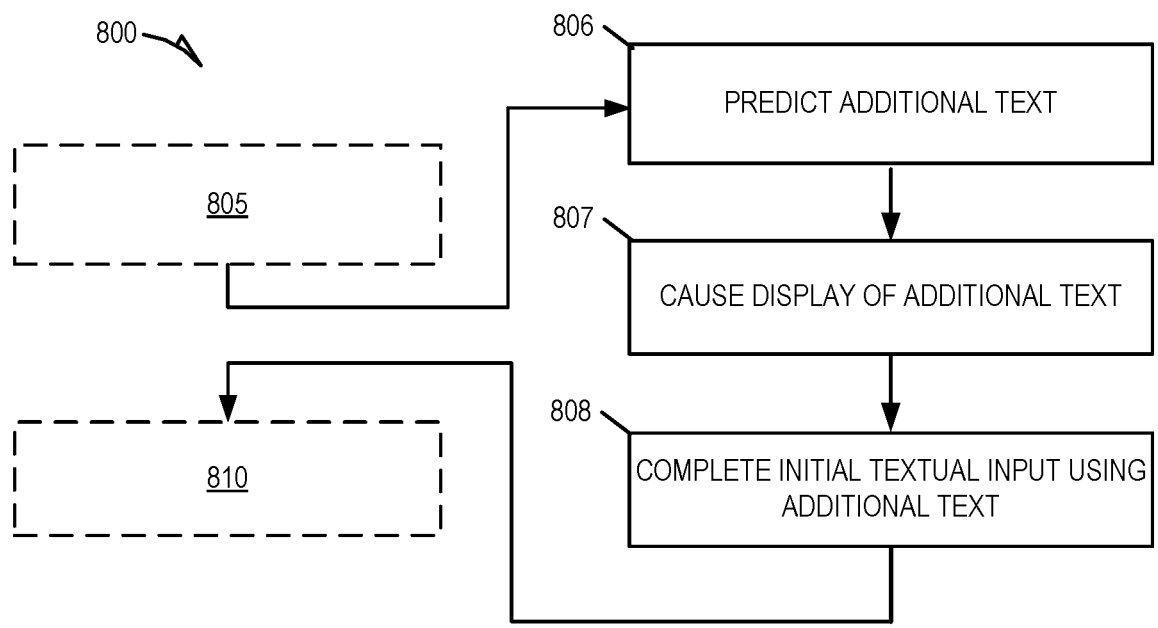

As shown in FIG. 12, the method 800 may include one or more of operations 806, 807, and 808. In some example embodiments, operations 806, 807, and 808 may occur after operation 805, in which the interface module 118 receives initial textual input entered into the data input field presented within the user interface. Further, the operations 806, 807, and 808 may be performed as the user 306 is attempting to enter further textual input into the data input field.

In some instances, the initial user input (e.g., textual input) includes a partial keyword or phrase (e.g., an incomplete word). At operation 806, the autocomplete module 112 predicts additional text to complete the partial keyword or phrase. The autocomplete module 112 may predict the additional text by parsing the initial text to identify the partial keyword or phrase, and comparing the partial keyword or phrases to a corpus of keywords and phrases. The corpus may comprise a dictionary of keywords and phrases of the input language, and may further include a list of historical keywords and phrases input by users. Based on the comparison, the autocomplete module 112 matches the partial keyword or phrase to a keyword or phrase in the corpus, and suggest the identified keyword or phrase as the additional textual input. The autocomplete module 112 may predict the partial keyword or phrase using one or more known autocomplete algorithms.

At operation 807, the interface module 118 causes display of the additional text in conjunction with the data input field displayed within the user interface rendered on the client device 310. Upon receiving a user selection of the additional text, the autocomplete module 112 causes the initial textual input to be completed using the additional text at operation 808.

FIGS. 13A-13F are interface diagrams depicting aspects of user interfaces provided by the SMAC system 100 in providing a SMAC service, according to example embodiments. The SMAC system 100 and the SMAC service described with reference to FIG. 13A-13F can form part of an automated valet service and interface flow. Example views of the interfaces are marked 1300A-1300F, respectively. Some process operations and user interactions are as described in the views.

Figure 13A:
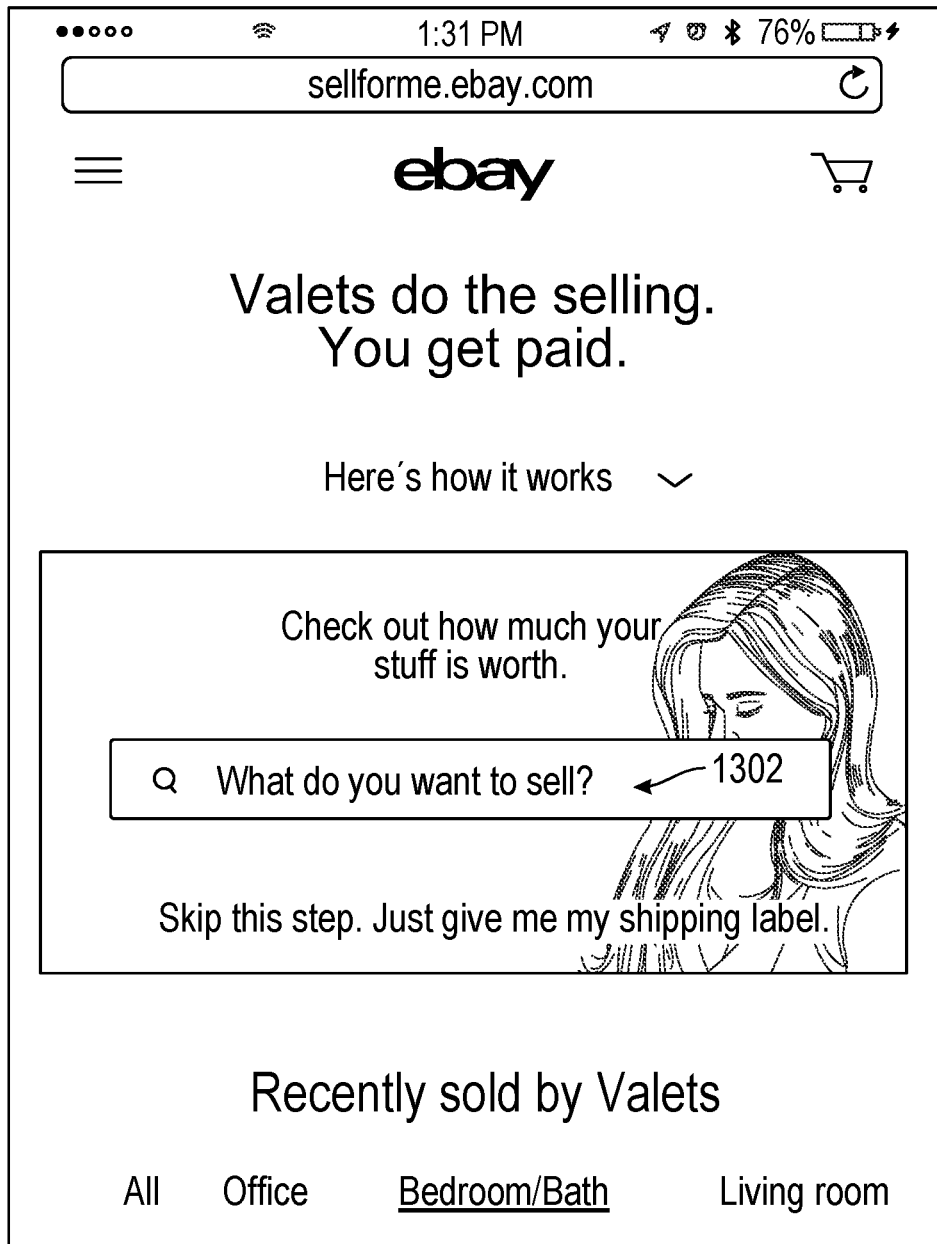
FIGS. 13A-13F are interface diagrams depicting aspects of user interfaces provided by the SMAC system in providing the SMAC service, according to example embodiments.
Figure 13B:
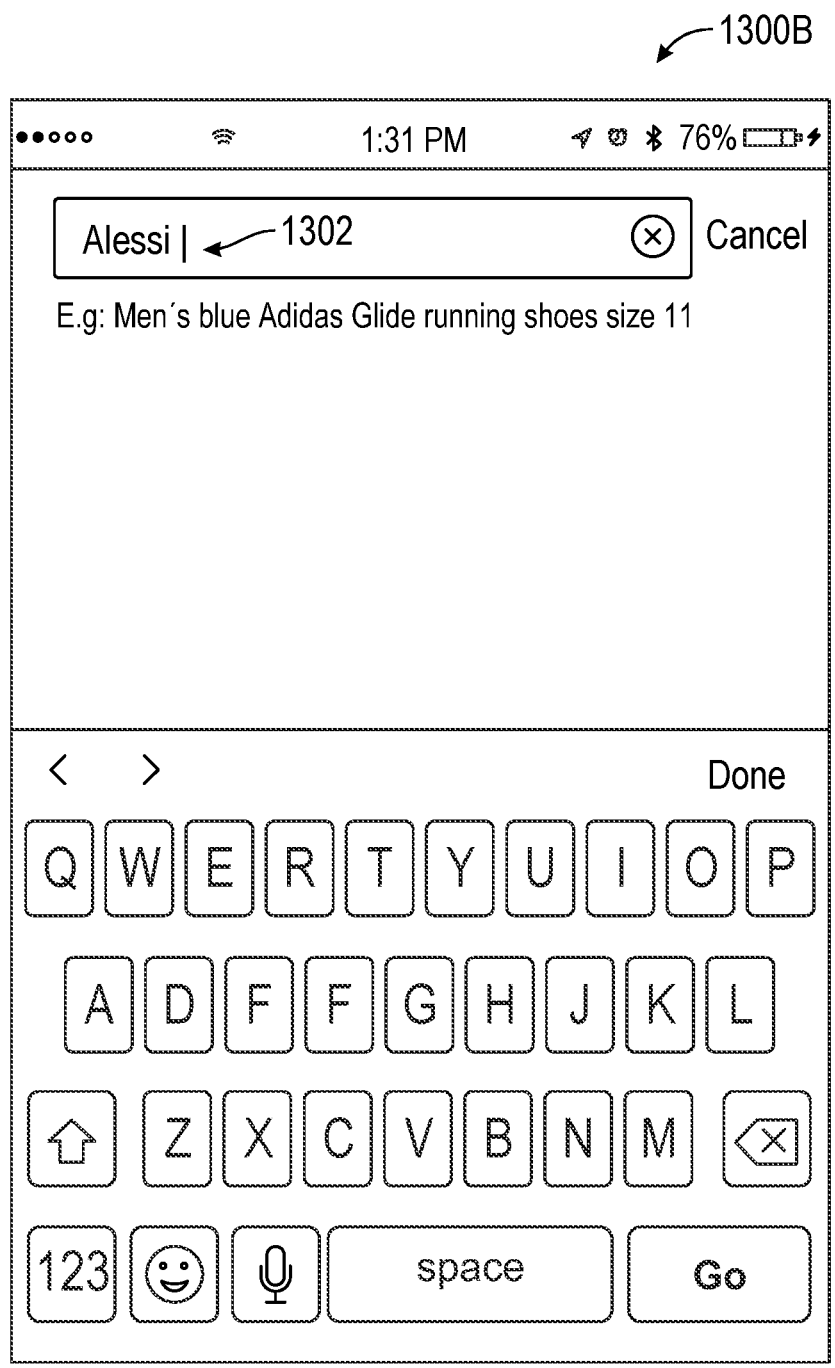
Figure 13C:
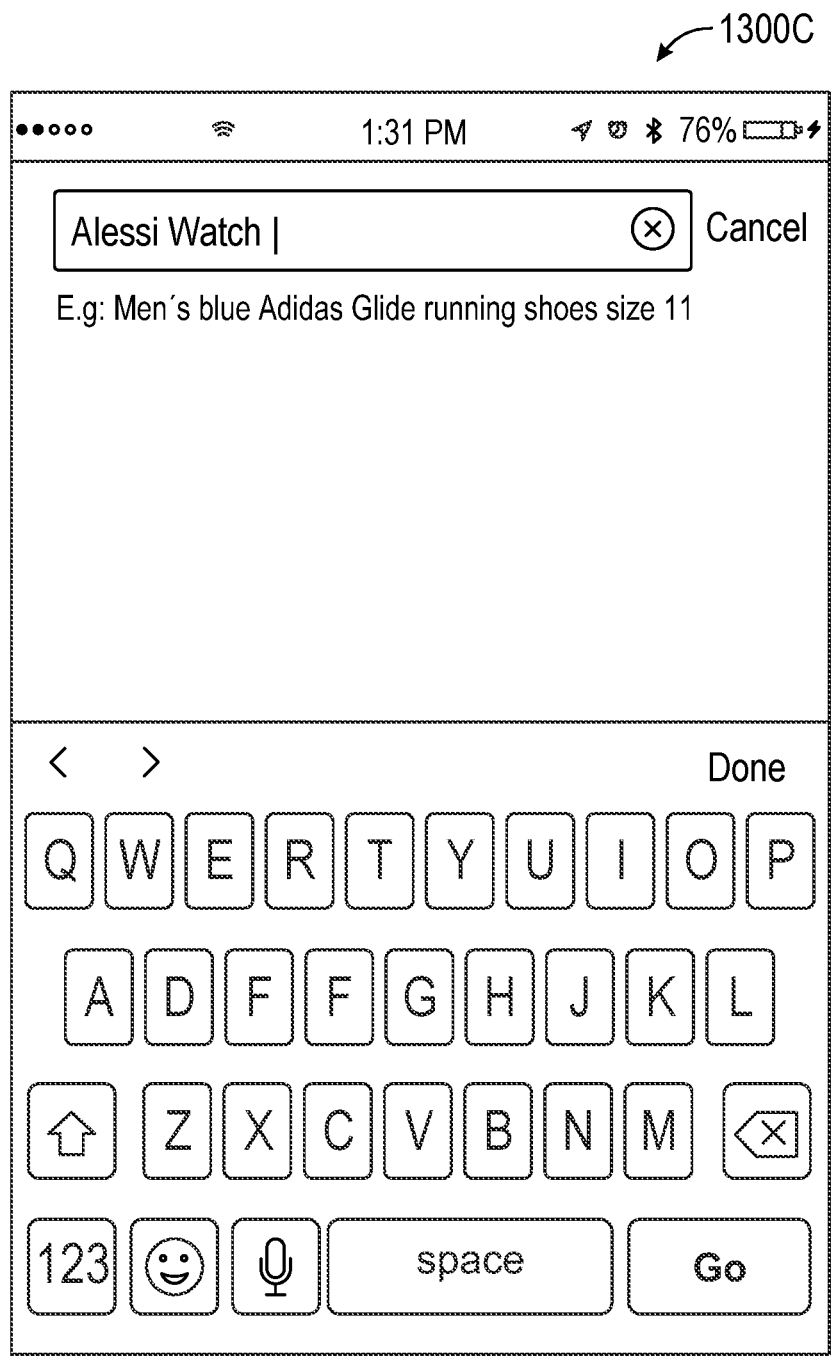

In interface 1300A of FIG. 13A, a user prompt "What do you want to sell?" is presented within a data input field 1302. In the interface 1300B of FIG. 13B, the user 306 starts to enter textual input in the data input field 1302 by typing, for example, "Alessi . . . " This typing continues in interface 1300C of FIG. 13C where the user enters "watch."

Figure 13D:
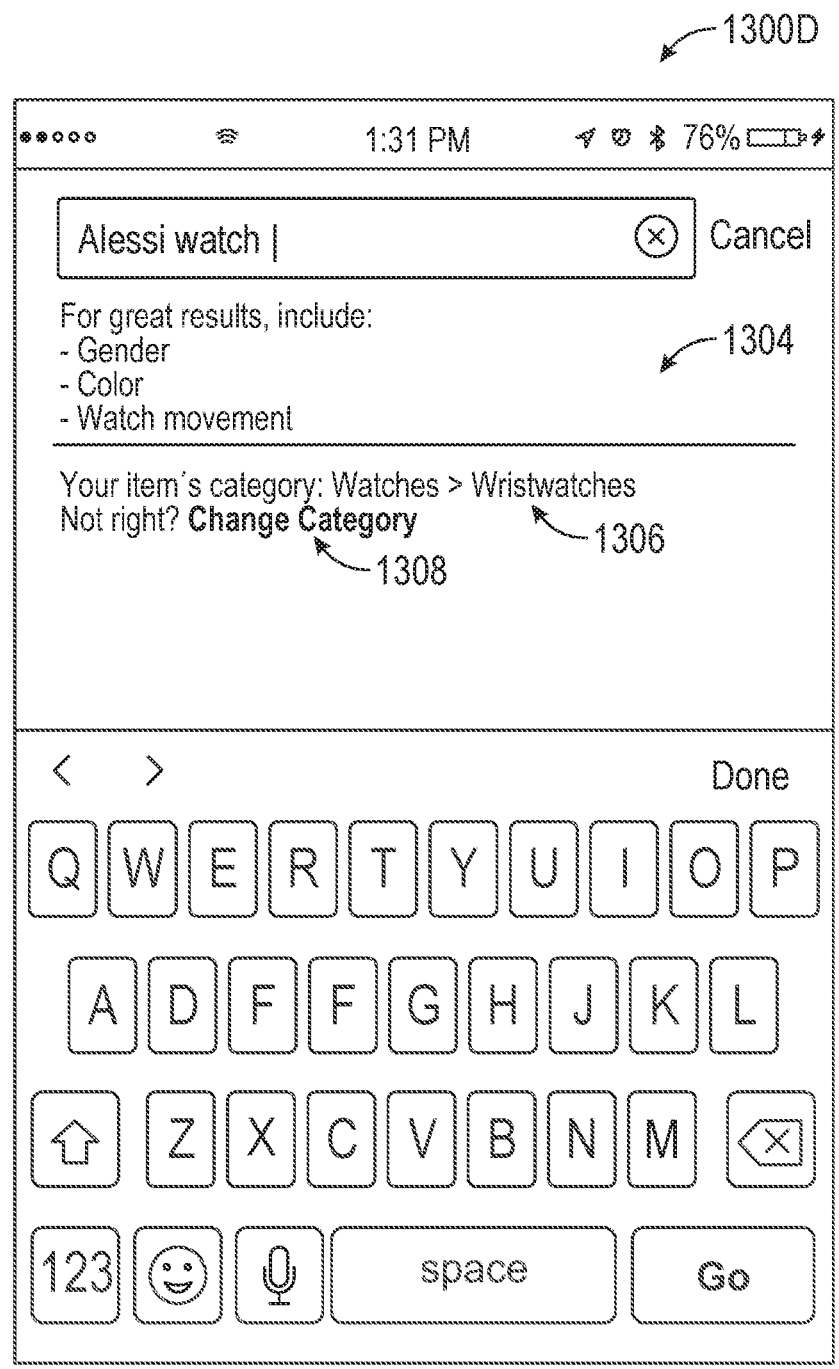

In the interface 1300D of FIG. 13D, a set of aspect suggestions are displayed by the SMAC system 100 upon determining that the textual input includes a threshold number of characters, which provides the SMAC system 100 with a certain degree of confidence (e.g., 80% confidence) of what the listed item is and the category that should be applied to it. In this case, entry of the word "watch" provides the requisite degree of confidence by bringing the textual input up to the threshold number of characters. The set of aspect suggestions are displayed within a suggestion box 1304 along with a display of a suggested category 1306 (e.g., the dominant category). The suggestion box 1304 further includes an invitation to change the suggested category 1306 if it is not correct. A clickable change category action element is shown at 1308.

Figure 13E:
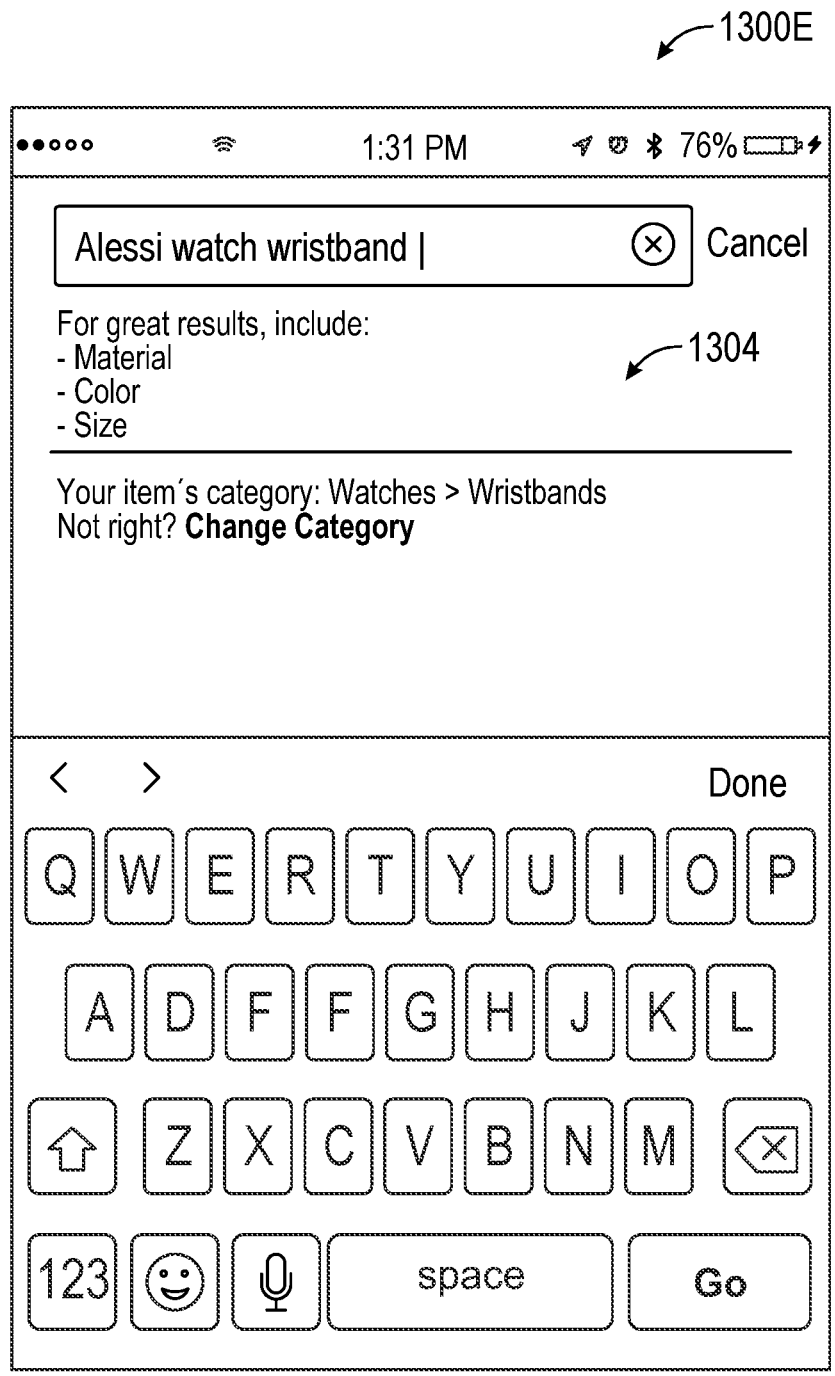

As the user 306 keeps typing in the interface 1300E of FIG. 13E, the set of aspect suggestions are updated and the suggested category 1306 is refined (e.g. wristwatches is changed to wristbands) as appropriate. The set of aspect suggestions included in the suggestion box 1304 may be updated in response to determining the additional text (e.g., "wristband") includes an aspect value that corresponds to the set of aspect suggestions. More specifically, one or more of the set aspect suggestions may be replaced with an alternative aspect suggestion.

Figure 13F:
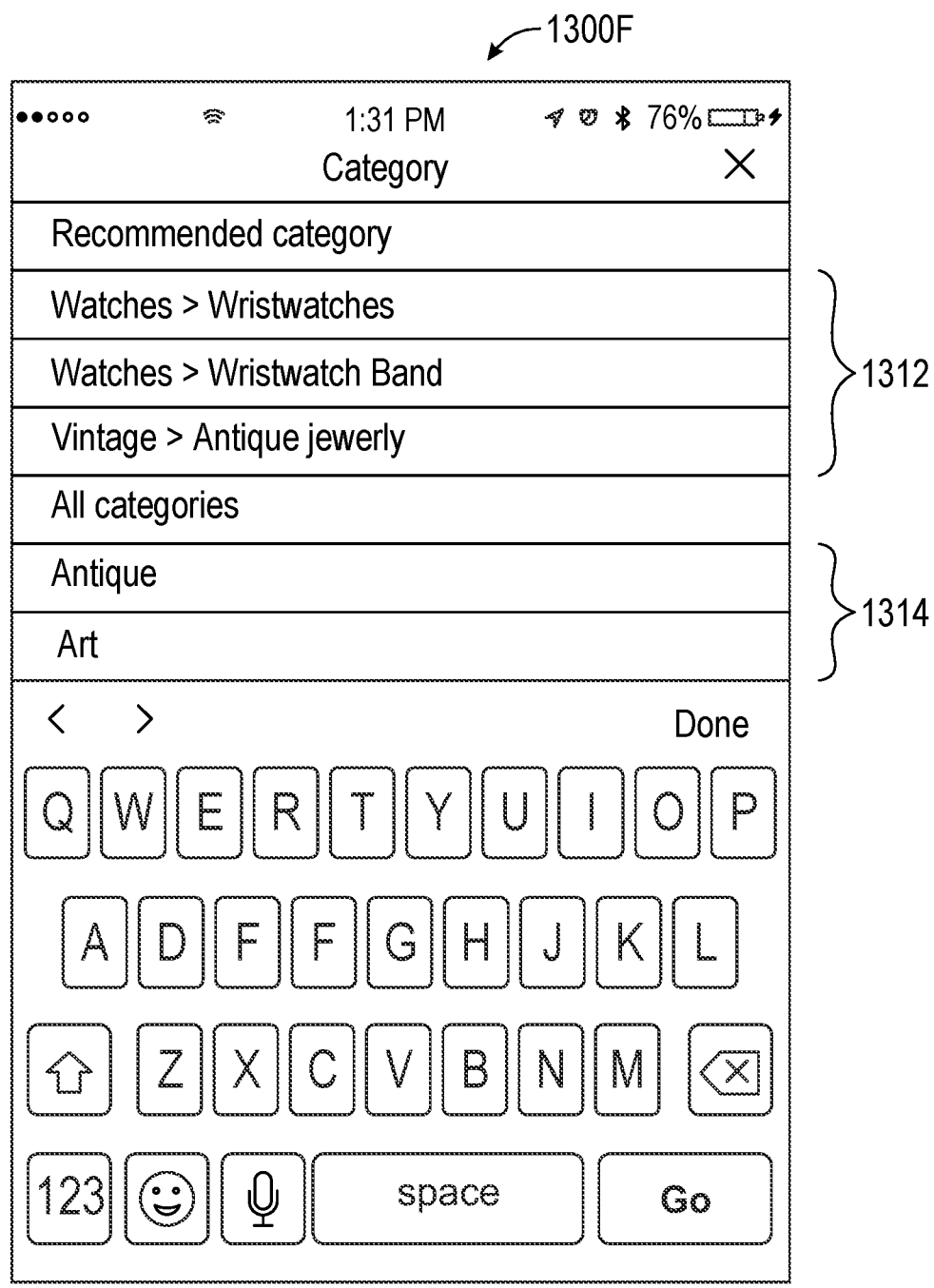

As shown in interface 1300F of FIG. 13F, if the user 306 clicks on the change category action element 1308 (referenced above with respect to interface 1300D) to change the suggested category 1306, a "Recommended category" panel 1312 is displayed for selection of an alternative category by the user 306. These selections may form part of a fixed group of categories, and are not made as free-entry terms. A further category panel 1314 for "All Categories" to broaden the selection may be provided.

Figure 14A:
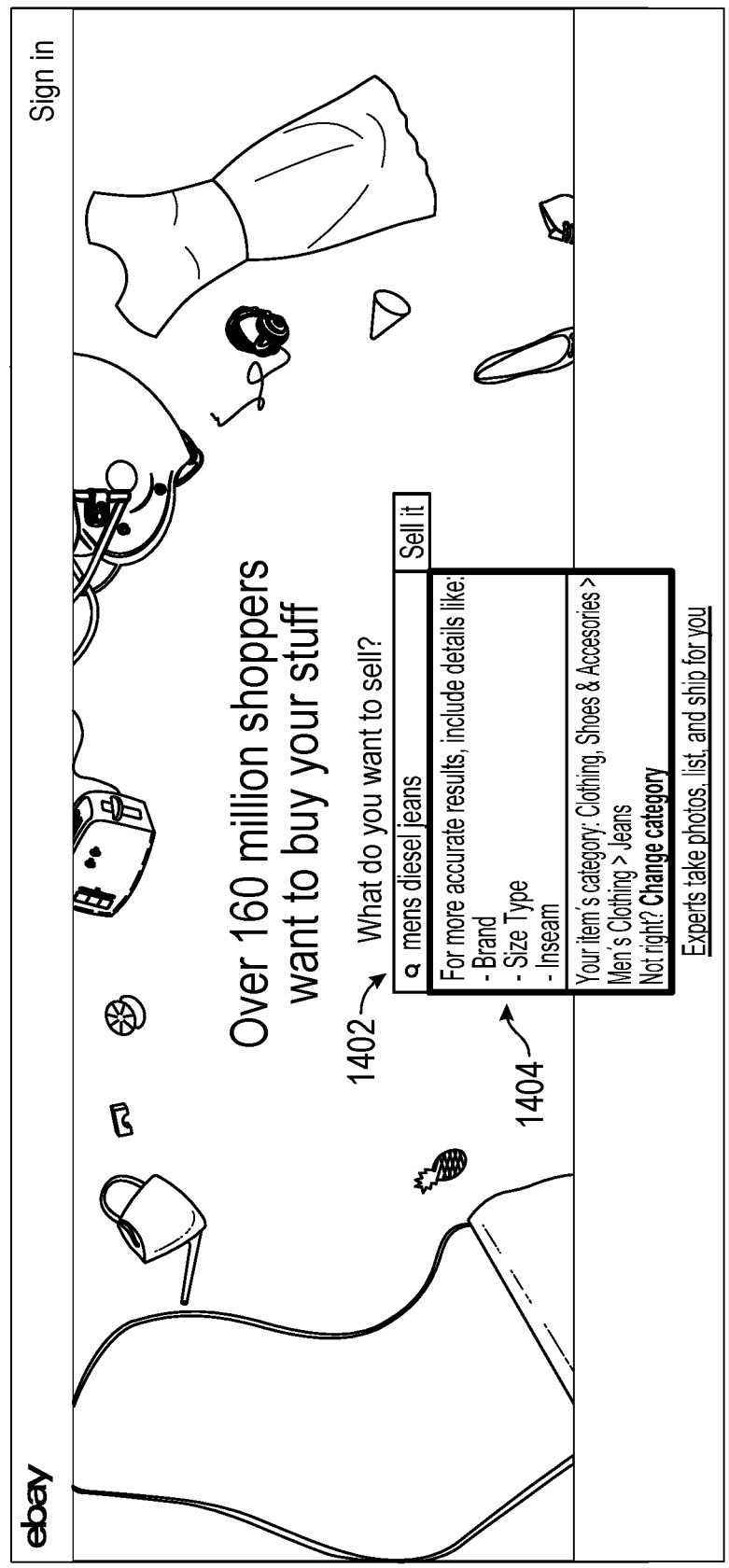
FIGS. 14A-C are interface diagram depicting aspects of user interfaces provided by the SMAC system in providing the SMAC service, according to example embodiments.
Figure 14B:
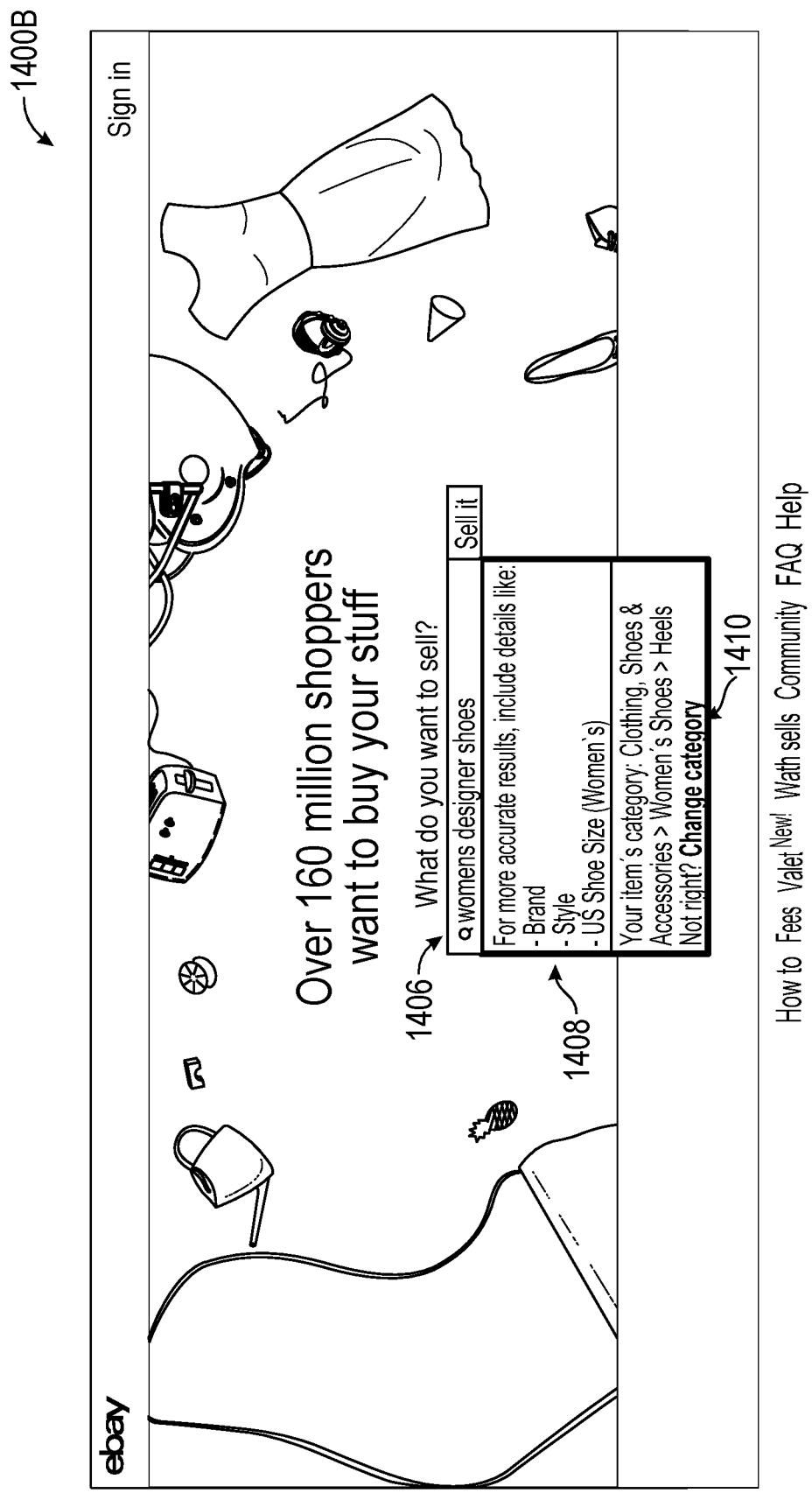
Figure 14C:
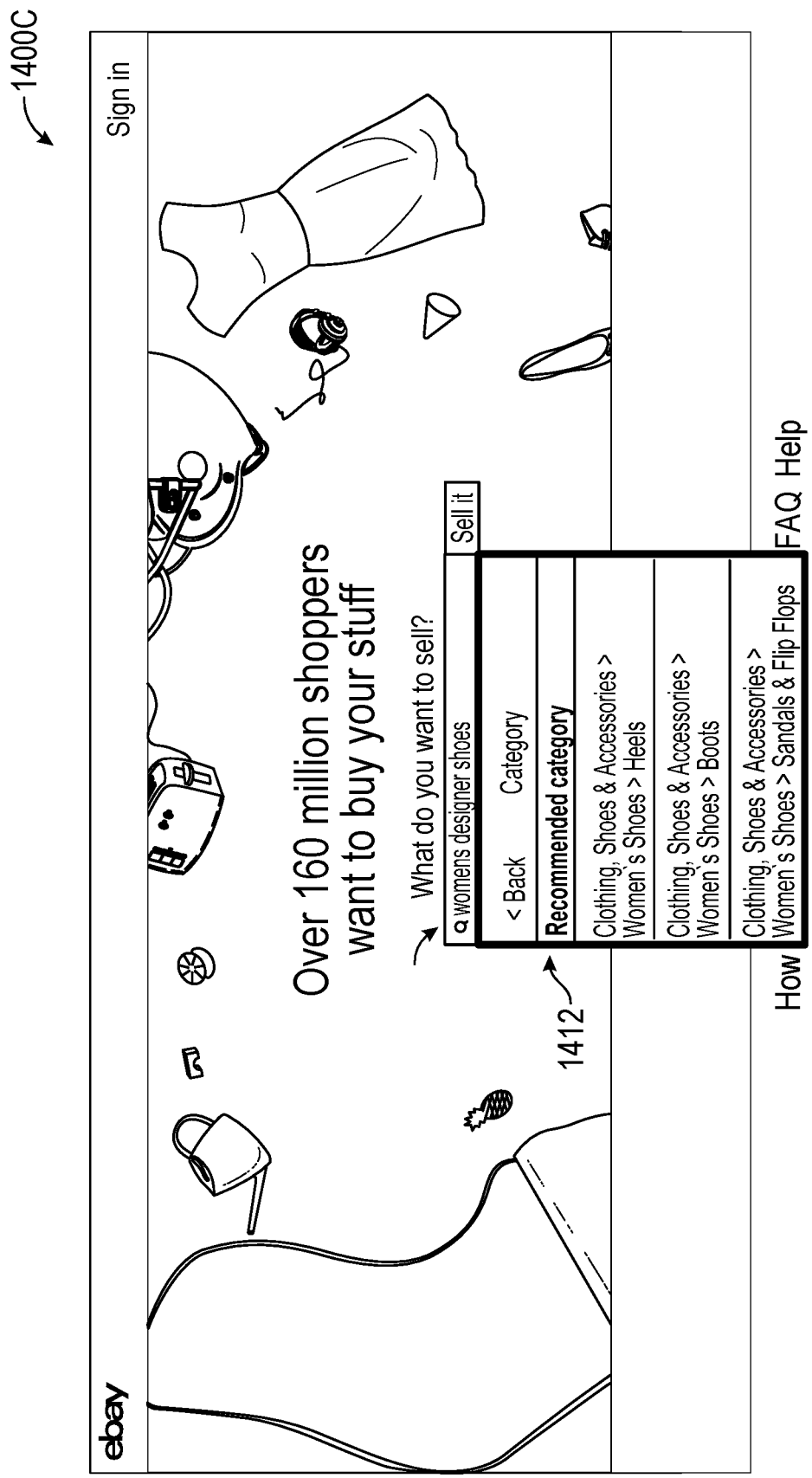

FIGS. 14A-C are interface diagrams depicting aspects of user interfaces provided by the SMAC system 100 in providing a SMAC service, according to example embodiments. The SMAC system 100 and the SMAC service described with reference to FIG. 14A-C can form part of an automated valet service. Example views of the interfaces are marked 1400A-1400C, respectively. Some process operations and user interactions are as described in the views.

In the interface 1400A of FIG. 14A, a user query "What do you want to sell?" is presented above a data input field 1402. As shown, the user 306 has typed "mens diesel jeans" in the data input field 1402. Responsive to receiving the textual input (e.g., "mens diesel jeans") from the user 306, a suggestion box 1404 is presented in the interface 1400A. The suggestion box 1404 includes a set of aspect suggestions for the product category corresponding to the textual input. In particular, the suggestion box 1404 includes the most important aspects for the product category as determined by the SMAC system 100. In this example, the category is identified as "jeans" and the most important aspects are "Brand," "Size Type," and "Inseam."

In the interface 1400B of FIG. 14B, the user 306 has typed "women's designer shoes" in the data input field 1406. As shown, the interface 1400B includes a suggestion box 1408 that includes the most import aspects for the category corresponding to the user input, which in this example include "Brand," "Style," and "US Shoe Size (Women's)." The suggestion box 1408 also includes an invitation to change the suggested category if it is not correct. A clickable change category element is shown at 1410.

In the interface 1400C of FIG. 14F, the user 306 has clicked the change category element shown at 1410 of the interface 1400B, and in response, a category selection menu 1412 is presented. The user 306 may select a different category from the one suggested in category selection menu 1412 in the interface 1400C, and in response, the most important aspects for the newly selected category may be displayed in the suggestion box 1408 of interface 1400B.

Service Architecture

Figure 15:
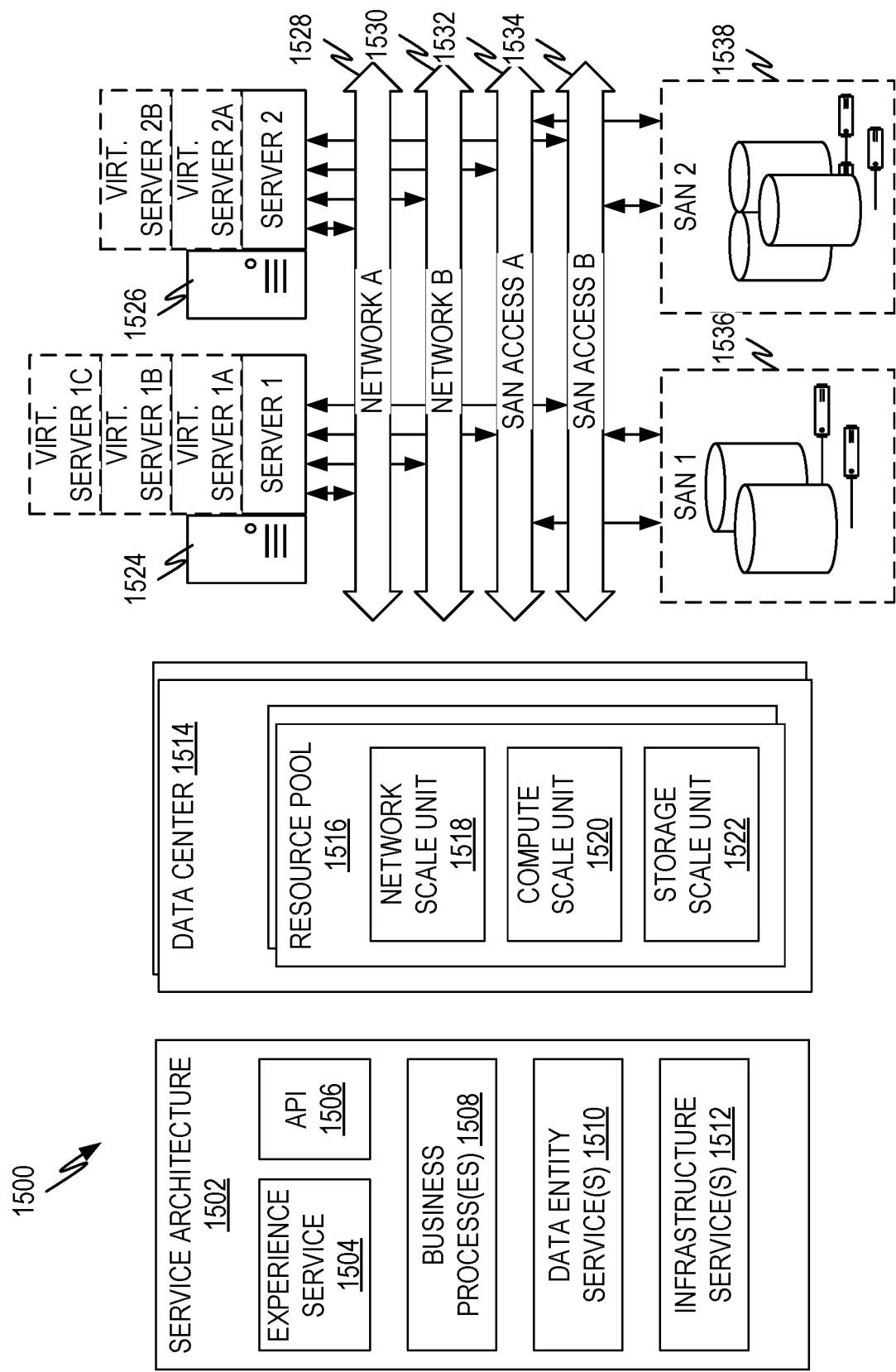
FIG. 15 is a diagram illustrating a service architecture in which the SMAC system may be implemented, according to some embodiments.

FIG. 15 is a diagram illustrating a service architecture 1500 in which the SMAC system 100 may be implemented, according to some embodiments. The service architecture 1500 presents various views of the service architecture in order to describe how the service architecture may be deployed on various data centers and/or cloud services. The architecture 1500 represents a suitable environment for implementation of the embodiments described herein.

The service architecture 1502 represents how a cloud architecture typically appears to a user, developer and so forth. The architecture is generally an abstracted representation of the actual underlying architecture implementation, represented in the other views of FIG. 15. For example, the service architecture 1502 comprises a plurality of layers that represent different functionality and/or services associated with the service architecture 1502.

The experience service layer 1504 represents a logical grouping of services and features from the end customer's point of view, built across different client platforms, such as applications running on a platform (mobile phone, desktop, etc.), web based presentation (mobile web, desktop web browser, etc.), and so forth. It includes rendering user interfaces and/or providing information to the client platform so that appropriate user interfaces can be rendered, capturing client input, and so forth. In the context of a marketplace, examples of services that would reside in this layer are home page (i.e., home view), view item listing, search/view search results, shopping cart, buying user interface and related services, selling user interface and related services, after sale experiences (posting a transaction, feedback, etc.), and so forth. In the context of other systems, the experience service layer 1504 would incorporate those end user services and experiences that are embodied by the system.

The API layer 1506 contains APIs which allow interaction with business process and core layers. This allows third party development against the service architecture 1502 and allows third parties to develop additional services on top of the service architecture 1502.

The business process service layer 1508 is where the business logic resides for the services provided. In the context of a marketplace this is where services such as user registration, user sign in, listing creation and publication, add to shopping cart, place an offer, checkout, send invoice, print labels, ship item, return item, and so forth would be implemented. The business process service layer 1508 also orchestrates between various business logic and data entities and thus represents a composition of shared services. The business processes in this layer can also support multi-tenancy in order to increase compatibility with some cloud service architectures.

The data entity service layer 1510 enforces isolation around direct data access and contains the services upon which higher level layers depend. Thus, in the marketplace context this layer can comprise underlying services like order management, financial institution management, user account services, and so forth. The services in this layer typically support multi-tenancy.

The infrastructure service layer 1512 comprises those services that are not specific to the type of service architecture being implemented. Thus, in the context of a marketplace, the services in this layer are services that are not specific or unique to a marketplace. Thus, functions like cryptographic functions, key management, CAPTCHA, authentication and authorization, configuration management, logging, tracking, documentation and management, and so forth reside in this layer.

Embodiments of the present disclosure will typically be implemented in one or more of these layers. For example, the interface module 118 may be implemented in the experience service layer 1502, and the orchestration engine 102, the category recognition module 108, the data retrieval module 110, and the autocomplete module 112, the aspect extraction module 114 may be implemented in the business process layer 1508 and the search cluster 104 and index generation system 106 may be implemented in the data entity service layer 1510.

The data center 1514 is a representation of the various resource pools 1516 along with their constituent scale units. This data center representation illustrates the scaling and elasticity that comes with implementing the service architecture 1502 in a cloud computing model. The resource pool 1516 is comprised of server (or compute) scale units 1520, network scale units 1518 and storage scale units 1522. A scale unit is a server, network and/or storage unit that is the smallest unit capable of deployment within the data center. The scale units allow for more capacity to be deployed or removed as the need increases or decreases.

The network scale unit 1518 contains one or more networks (such as network interface units, etc.) that can be deployed. The networks can include, for example virtual LANs. The compute scale unit 1520 typically comprise a unit (server, etc.) that contains a plurality processing units, such as processors. The storage scale unit 1522 contains one or more storage devices such as disks, storage attached networks (SAN), network attached storage (NAS) devices, and so forth. These are collectively illustrated as SANs in the description below. Each SAN may comprise one or more volumes, disks, and so forth.

The remaining view of FIG. 15 illustrates another example of a service architecture 1500. This view is more hardware focused and illustrates the resources underlying the more logical architecture in the other views of FIG. 15. A cloud computing architecture typically has a plurality of servers or other systems 1524, 1526. These servers comprise a plurality of real and/or virtual servers. Thus the server 1524 comprises server 1 along with virtual servers 1A, 1B, 1C and so forth.

The servers are connected to and/or interconnected by one or more networks such as network A 1528 and/or network B 1530. The servers are also connected to a plurality of storage devices, such as SAN 1 (1536), SAN 2 (1538) and so forth. SANs are typically connected to the servers through a network such as SAN access A 1532 and/or SAN access B 1534.

The compute scale units 1520 are typically some aspect of servers 1524 and/or 1526, like processors and other hardware associated therewith. The network scale units 1518 typically include, or at least utilize the illustrated networks A (1528) and B (1532). The storage scale units typically include some aspect of SAN 1 (1536) and/or SAN 2 (1538). Thus, the logical service architecture 1502 can be mapped to the physical architecture.

Services and/or other implementation of the embodiments described herein will run on the servers and/or virtual servers and utilize the various hardware resources to implement the disclosed embodiments.

Machine Architecture

Figure 16:
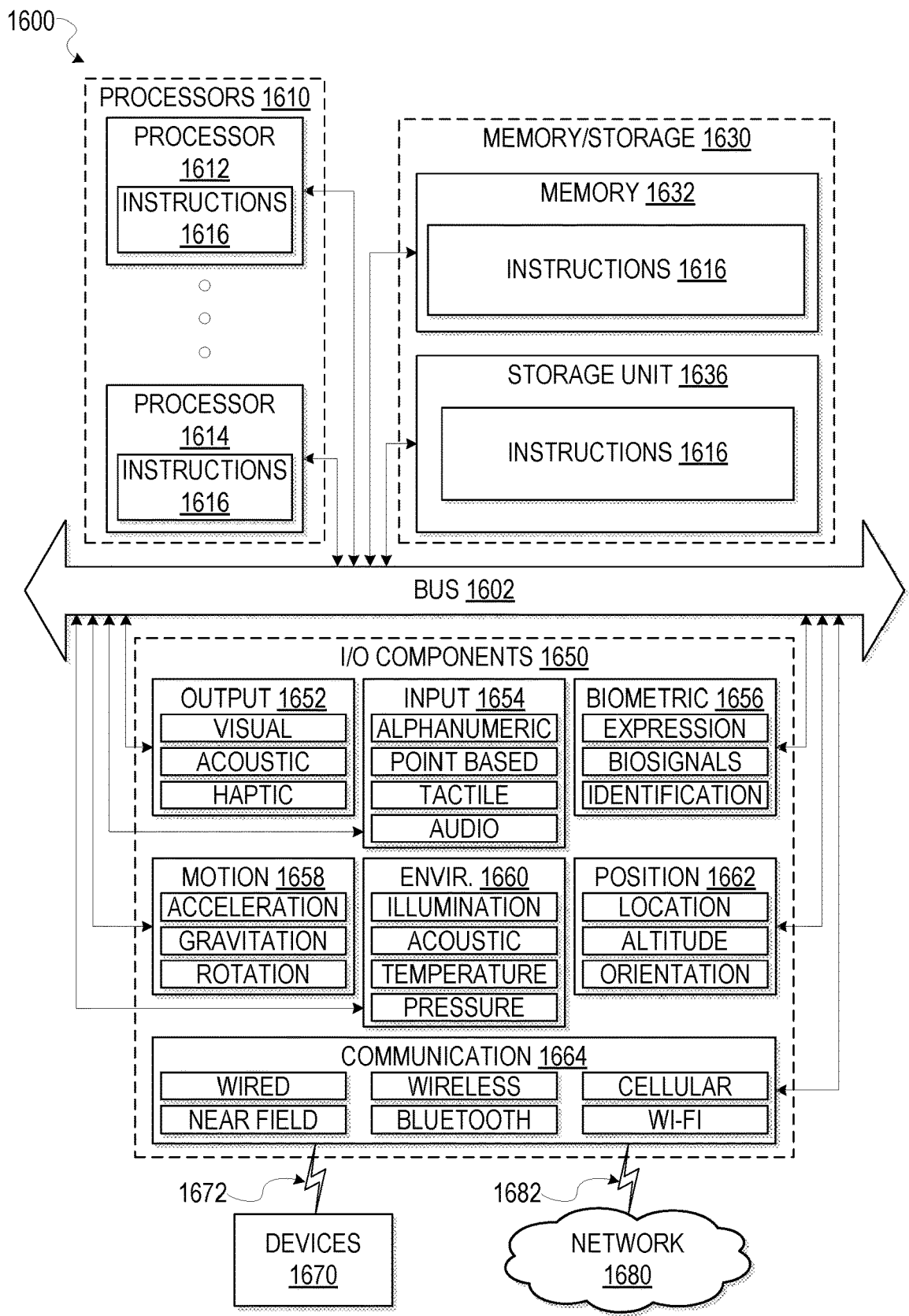
FIG. 16 is a block diagram illustrating components of a machine, according to some example embodiments, able to read instructions from a machine-readable medium (e.g., a machine-readable storage medium) and perform any one or more of the methodologies discussed herein.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. For example, the instructions 1616 may include executable code that causes the machine 1600 to execute any one of the methods 400 or 800. These instructions transform the general, non-programmed machine into a particular machine programmed to carry out the described and illustrated functions of the publication system 342 and the SMAC system 100 in the manner described herein. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. By way of non-limiting example, the machine 1600 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by the machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory/storage 1630, and I/O components 1650, which may be configured to communicate with each other such as via a bus 1602. In an example embodiment, the processors 1610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1612 and a processor 1614 that may execute the instructions 1616. The term "processor" is intended to include a multi-core processor that may comprise two or more independent processors (sometimes referred to as "cores") that may execute instructions contemporaneously. Although FIG. 16 shows multiple processors, the machine 1600 may include a single processor with a single core, a single processor with multiple cores (e.g., a multi-core processor), multiple processors with a single core, multiple processors with multiples cores, or any combination thereof.

The memory/storage 1630 may include a memory 1632, such as a main memory, or other memory storage, and a storage unit 1636, both accessible to the processors 1610 such as via the bus 1602. The storage unit 1636 and memory 1632 store the instructions 1616 embodying any one or more of the methodologies or functions described herein. The instructions 1616 may also reside, completely or partially, within the memory 1632, within the storage unit 1636, within at least one of the processors 1610 (e.g., within the processor's cache memory), or any suitable combination thereof, during execution thereof by the machine 1600. Accordingly, the memory 1632, the storage unit 1636, and the memory of the processors 1610 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 1616. The term "machine-readable medium" shall also be taken to include any medium, or combination of multiple media, that is capable of storing instructions (e.g., instructions 1616) for execution by a machine (e.g., machine 1600), such that the instructions, when executed by one or more processors of the machine (e.g., processors 1610), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion, and the grouping is in no way limiting. In various example embodiments, the I/O components 1650 may include output components 1652 and input components 1654. The output components 1652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environmental components 1660, or position components 1662, among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1658 may include acceleration sensor components (e.g., accelerometer), gravitation sensor components, rotation sensor components (e.g., gyroscope), and so forth. The environmental components 1660 may include, for example, illumination sensor components (e.g., photometer), temperature sensor components (e.g., one or more thermometers that detect ambient temperature), acoustic sensor components (e.g., one or more microphones that detect background noise), or other components that may provide indications, measurements, or signals corresponding to a surrounding physical environment. The position components 1662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via a coupling 1682 and a coupling 1672 respectively. For example, the communication components 1664 may include a network interface component or other suitable device to interface with the network 1680. In further examples, the communication components 1664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a Universal Serial Bus (USB)).

Moreover, the communication components 1664 may detect identifiers or include components operable to detect identifiers. For example, the communication components 1664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1664, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network and the coupling 1682 may be a Code Division Multiple Access (CDMA) connection, a Global System for Mobile communications (GSM) connection, or another type of cellular or wireless coupling. In this example, the coupling 1682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., hypertext transfer protocol (HTTP)). Similarly, the instructions 1616 may be transmitted or received using a transmission medium via the coupling 1672 (e.g., a peer-to-peer coupling) to the devices 1670. The term "transmission medium" shall be taken to include any intangible medium that is capable of storing, encoding, or carrying the instructions 1616 for execution by the machine 1600, and includes digital or analog communications signals or other intangible media to facilitate communication of such software.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network 304.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Language

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
   one or more processors; and
   a computer readable medium storing instructions that, when executed by the one or more processors, cause the system to perform operations comprising:
   receiving initial user input entered via an data input field of a user interface rendered on a client device;
   detecting a dominant category of an item represented by the initial user input;
   identifying sub-categories of the detected dominant category;
   selecting, from the sub-categories, a set of sub-category suggestions to complete the initial user input based on a ranking of each sub-category in the sub-categories of the detected dominant category; and
   causing display, within the user interface rendered on the client device, of a suggestion box presented in conjunction with the data input field, the suggestion box comprising a presentation of the detected dominant category as a suggested category, a presentation of the set of sub-category suggestions corresponding to the detected dominant category, a presentation of a hierarchical representation of a position of the detected dominant category under a parent category in a category tree categorizing item listings, an invitation to change the detected dominant category by selecting an alternative category from the category tree, the alternative category selectable to replace the set of sub-category suggestions corresponding to the detected dominant category with alternative sub-category suggestions corresponding to the alternative category, and a prompt to complete the initial user input by adding an undisplayed aspect value of one of the sub-category suggestions.

2. The system of claim 1, wherein the operations further comprise:
   receiving further user input entered via the data input field of the user interface rendered on the client device; and
   causing an update, based on the further user input, to the display of the suggestion box by replacing one of the sub-category suggestions with one of the alternative sub-category suggestions.

3. The system of claim 1, wherein the operations further comprise:
   receiving a selection of a clickable action element associated with the invitation to change the detected dominant category;
   causing, in response to receiving the selection of the clickable action element, display, within the user interface rendered on the client device, of the alternative category;
   receiving a selection of the alternative category; and
   in response to receiving the selection of the alternative category, causing an update of the display of the suggestion box, without updating a display of the initial user input, by replacing the presentation of the set of sub-category suggestions with a presentation of the alternative sub-category suggestions corresponding to the alternative category.

4. The system of claim 1, wherein the operations further comprise:
   receiving further user input entered via the data input field of the user interface rendered on the client device;
   identifying a data record stored in a network-based storage device based on a combination of the initial user input and the further user input; and
   retrieving the data record from the network-based storage device.

5. A method comprising:
   receiving initial user input entered via an data input field of a user interface rendered on a client device;
   detecting, using one or more processors, a dominant product category of a product represented by the initial user input;
   identifying sub-categories of the detected dominant category;
   selecting, from the sub-categories, a set of sub-category suggestions to complete the initial user input based on a ranking of each sub-category of the sub-categories of the detected dominant product category; and
   causing display, within the user interface rendered on the client device, of a suggestion box presented in conjunction with the data input field, the suggestion box comprising a presentation of the set of sub-category suggestions corresponding to the detected dominant product category, a presentation of a hierarchical representation of the detected dominant product category, an invitation to change the detected dominant product category by selecting an alternative product category from a product category tree categorizing product listings, the alternative product category selectable to replace the set of sub-category suggestions corresponding to the detected dominant product category with alternative sub-category suggestions corresponding to the alternative product category, and a prompt to complete the initial user input by adding an undisplayed aspect value of one of the sub-category suggestions.

6. The method of claim 5,
   receiving further user input entered via the data input field of the user interface rendered on the client device;
   extracting an aspect value from the further user input, the aspect value corresponding to a sub-category suggestion in the set of sub-category suggestions corresponding to the detected dominant product category; and causing an update, based on the extracted aspect value, of the display of the suggestion box by replacing the sub-category suggestion with an alternative sub-category suggestion.

7. The method of claim 5, further comprising:
receiving further user input entered via the data input field of the user interface rendered on the client device;
identifying a data record stored in a network-based storage device based on a combination of the initial user input and the further user input; and
retrieving the data record from the network-based storage device.

8. The method of claim 5, wherein:
the prompt includes a suggestion for a user to provide the undisplayed aspect value corresponding to at least one of the sub-category suggestions of the set of sub-category suggestions; and
receiving further user input providing the undisplayed aspect value.

9. The method of claim 5, further comprising:
receiving a selection of the alternative product category; and
in response to receiving the selection of the alternative product category, causing an update of the display of the suggestion box by replacing the presentation of the set of sub-category suggestions corresponding to the detected dominant product category with a presentation of the alternative sub-category suggestions corresponding to the alternative product category.

10. The method of claim 5, wherein the causing of the display of the suggestion box occurs while a user is entering further user input into the data input field of the user interface.

11. The method of claim 5, further comprising detecting a threshold number of alphanumeric characters being entered into the data input field;
wherein the initial user input comprises textual input comprising the threshold number of alphanumeric characters; and
wherein detecting the dominant product category occurs responsive to detecting the threshold number of alphanumeric characters.

12. The method of claim 5, further comprising:
identifying a plurality of possible categories corresponding to the initial user input;
determining a confidence score of each possible category in the plurality of possible categories; and
selecting the dominant product category from the plurality of possible category identified based on the determined confidence score of the dominant product category.

13. The method of claim 5, further comprising:
extracting an aspect value from further user input, the aspect value corresponding to a sub-category suggestion in the set of sub-category suggestions corresponding to the detected dominant product category; and
prepopulating an electronic form using the extracted aspect value.

14. The method of claim 5, wherein the initial user input comprises textual input; and the method further comprises:
predicting additional text to complete the initial user input entered in the data input field of the user interface;
providing the additional text for display in the user interface in conjunction with the data input field; and
completing the initial user input using the additional text in response to receiving a user selection of the additional text.

15. The method of claim 5, wherein the identifying of the sub-categories of the detected dominant product category comprises:
accessing a compact index document comprising a plurality of categories and a set of sub-categories for each category in the plurality of categories; and
searching the compact index document for sub-categories of the detected dominant product category.

16. The method of claim 15, further comprising:
generating, in an offline batch job, the compact index document; and injecting the compact index document into a search cluster operable to search the compact index document;
wherein the searching of the compact index document is performed by the search cluster.

17. A non-transitory machine-readable storage medium embodying instructions that, when executed by one or more processors of a machine, cause the machine to perform operations comprising:
receiving initial user input entered via an data input field of a user interface rendered on a client device;
identifying a dominant category corresponding to the initial user input;
identifying a set of aspects of products in the dominant category;
selecting, from the set of aspects, a set of aspect suggestions to complete the initial user input based on a ranking of each aspect in the set of aspects, the ranking assigned based on a measure of how much each aspect provides differentiating detail among the products within the dominant category, the set of aspect suggestions comprising a subset of the set of aspects corresponding to the dominant category; and
causing display, within the user interface rendered on the client device, of a suggestion box presented in conjunction with the data input field, the suggestion box comprising a presentation of the set of aspect suggestions corresponding to the detected dominant category, a presentation of a hierarchical representation of the detected dominant category in a category tree categorizing item listings, an invitation to change the identified dominant category by selecting an alternative category from the category tree. the alternative category selectable to replace the set of aspect suggestions corresponding to the identified dominant category with alternative aspect suggestions corresponding to the alternative category, and a prompt to complete the initial user input using the set of aspect suggestions.

18. The non-transitory machine-readable storage medium of claim 17, wherein the operations further comprise:
receiving further user input entered via the data input field of the user interface rendered on the client device; and
updating, based on the further user input, the display of the suggestion box by replacing one of the aspect suggestions with one of the alternative aspect suggestions.

19. The non-transitory machine-readable storage medium of claim 17, wherein the operations further comprise:
receiving a selection of the alternative category; and
in response to receiving the selection of the alternative category, causing an update of the display of the suggestion box by replacing the presentation of the set of aspect suggestions with a presentation of the alternative aspect suggestions corresponding to the alternative category.

20. The non-transitory machine-readable storage medium of claim 17, wherein the operations further comprise:

receiving further user input entered via the data input field of the user interface rendered on the client device;

identifying a data record stored in a network-based storage device based on a combination of the initial user input and the further user input; and retrieving the data record from the network-based storage device.

* * * * *